US011568274B2

(12) United States Patent
Nanavati et al.

(10) Patent No.: US 11,568,274 B2
(45) Date of Patent: Jan. 31, 2023

(54) SURFACING UNIQUE FACTS FOR ENTITIES

(71) Applicant: Google Inc., Mountain View, CA (US)

(72) Inventors: Akash Nanavati, Mountain View, CA (US); Aniket Ray, Santa Clara, CA (US); Torsten Rohlfing, Saratoga, CA (US)

(73) Assignee: Google LLC, Mountain View, CA (US)

( * ) Notice: Subject to any disclaimer, the term of this patent is extended or adjusted under 35 U.S.C. 154(b) by 1201 days.

(21) Appl. No.: 15/648,047

(22) Filed: Jul. 12, 2017

(65) Prior Publication Data

US 2018/0039889 A1    Feb. 8, 2018

Related U.S. Application Data

(60) Provisional application No. 62/371,461, filed on Aug. 5, 2016.

(51) Int. Cl.
*G06N 5/02* (2006.01)
*G06F 16/93* (2019.01)
(Continued)

(52) U.S. Cl.
CPC ............ *G06N 5/022* (2013.01); *G06F 16/38* (2019.01); *G06F 16/93* (2019.01); *G06F 16/951* (2019.01); *G06F 2216/03* (2013.01)

(58) Field of Classification Search
CPC ....... G06N 5/022; G06F 16/334; G06F 16/35; G06F 16/367; G06F 16/38; G06F 16/93;
(Continued)

(56) References Cited

U.S. PATENT DOCUMENTS 8,655,866 B1    2/2014   Provine et al.
8,719,244 B1    5/2014   Pasca
(Continued)

FOREIGN PATENT DOCUMENTS

CN    102163215 A    8/2011
CN    104615724 A    5/2015
(Continued)

OTHER PUBLICATIONS

C. Ribeiro, R. Salmon, S. Amarala and C. Hamada, "Sentence level fact based search engine: News Fact Finder," 2010 IEEE International Conference on Information Reuse & Integration, Las Vegas, NV, USA, 2010, pp. 368-373, doi: 10.1109/IRI.2010.5558906. (Year: 2010).*

(Continued)

*Primary Examiner* — James D. Rutten
(74) *Attorney, Agent, or Firm* — Brake Hughes Bellermann LLP

(57) ABSTRACT

Systems and methods identify and provide interesting facts about an entity. An example method includes selecting documents associated with at least one unique fact trigger, the documents being from a document repository. The method also includes generating entity-sentence pairs from the documents and, for a first entity of the entities represented by the entity-sentence pairs, clustering the entity-sentence pairs for the first entity using salient terms occurring in the sentence. The method also includes determining a representative sentence for each of the clusters and providing at least one of the representative sentences in response to a query that identifies the first entity. Another example method includes determining that a query relates to an entity in a knowledge base, determining that the entity has an associated unique fact list, and providing at least one of the unique facts in the list in response to the query.

23 Claims, 11 Drawing Sheets

(51) Int. Cl.
*G06F 16/951* (2019.01)
*G06F 16/38* (2019.01)

(58) Field of Classification Search
CPC . G06F 16/951; G06F 16/9535; G06F 2216/03
See application file for complete search history.

(56) References Cited

U.S. PATENT DOCUMENTS

| | | | | |
|---|---|---|---|---|
| 9,084,025 | B1* | 7/2015 | Gossweiler, III | G06F 16/489 |
| 9,110,977 | B1* | 8/2015 | Pierre | G06F 16/3334 |
| 2001/0051940 | A1* | 12/2001 | Soulanille | G06Q 30/0601 |
| 2004/0139106 | A1* | 7/2004 | Bachman | G06F 16/951 |
| 2006/0293879 | A1* | 12/2006 | Zhao | G06F 16/84 |
| | | | | 704/9 |
| 2007/0179930 | A1* | 8/2007 | Wang | G06F 16/334 |
| 2007/0198480 | A1 | 8/2007 | Hogue et al. | |
| 2010/0042619 | A1* | 2/2010 | Jones | G06F 16/24568 |
| | | | | 707/770 |
| 2010/0082620 | A1* | 4/2010 | Jennings, III | G06F 16/285 |
| | | | | 707/736 |
| 2010/0125570 | A1* | 5/2010 | Chapelle | G06F 16/951 |
| | | | | 707/E17.014 |
| 2011/0218947 | A1* | 9/2011 | Vadlamani | G06F 16/00 |
| | | | | 706/12 |
| 2012/0150920 | A1* | 6/2012 | Roulland | G06F 16/93 |
| | | | | 707/805 |
| 2013/0041921 | A1* | 2/2013 | Cooper | G06F 16/3338 |
| | | | | 707/780 |
| 2013/0166585 | A1* | 6/2013 | Das Sarma | G06F 16/242 |
| | | | | 707/767 |
| 2013/0173639 | A1* | 7/2013 | Chandra | G06F 16/951 |
| | | | | 707/754 |
| 2013/0325440 | A1* | 12/2013 | Kim | G06F 16/951 |
| | | | | 704/9 |
| 2014/0136323 | A1* | 5/2014 | Zhang | G06Q 10/10 |
| | | | | 705/14.53 |
| 2014/0214881 | A1* | 7/2014 | Braham | G06F 16/93 |
| | | | | 707/769 |
| 2015/0154193 | A1 | 6/2015 | Dave et al. | |
| 2016/0277485 | A1* | 9/2016 | Abrams | G06Q 50/01 |

FOREIGN PATENT DOCUMENTS

| | | |
|---|---|---|
| CN | 104978396 A | 10/2015 |
| WO | 2015/084757 A1 | 6/2015 |

OTHER PUBLICATIONS

First Office Action for CN Application No. 201710661288.0 (with English translation), dated Sep. 23, 2020, 20 pages.
International Search Report and Written Opinion for PCT Patent Application No. PCT/US2017/041885, dated Aug. 30, 2017, 12 pages.
Yahya, et al., "ReNoun: Fact Extraction for Nominal Attributes", Proceedings of Conference on Empirical Methods in Natural Language Processing, Oct. 25-29, 2014, pp. 325-335.

* cited by examiner

SURFACING UNIQUE FACTS FOR ENTITIES

RELATED APPLICATION

This application is a non-provisional of, and claims priority to, U.S. Provisional Application No. 62/371,461, filed on Aug. 5, 2016, titled "Surfacing Unique Facts for Entities," the disclosure of which is incorporated herein by reference.

BACKGROUND

Search engines traditionally search for query terms that appear in documents, such as web pages accessible over the Internet. Search engines can be used to search other data sources, such as a knowledge base. A knowledge base stores information (e.g., attributes or facts) about entities. The facts stored for an entity in the knowledge base tend to be structured or modeled, or in other words common to all instances of entities of a certain type. For example, the knowledge base may include scientific name, lifespan, mass, conservation status, etc. for animal entities and may have population, geographic location, and mayor for city entities. Information from the knowledge base can be included with documents in response to a query that mentions an entity in the knowledge base.

SUMMARY

Implementations provide an improved search engine that automatically identifies and provides unique facts in response to a query for a particular entity. For example, implementations may identify and extract sentences that represent unique facts for an entity from a document repository, determine the best facts, and provide one or more of these facts in response to a query directed toward the entity. The query may specifically request unique or fun facts for the entity or may be a query directed to the entity. The system may automatically select high-quality, well-supported facts over facts expressed in a poor fashion or facts that lack support. The system may use poorly-formed sentences and sentences that require context to support a fact but may not provide such sentences in response to the query. In some implementations, the system may cluster sentences so that sentences supporting a particular fact are clustered together and may select one sentence from the cluster as a representative sentence for the cluster. The sentences provided in response to the query may be the representative sentences and the system may analyze the representative sentences to ensure that duplicate facts are not displayed. The sentences may be displayed in a random order or, in some implementations, the sentences and clusters may be scored so that higher-scoring representative sentences are provided ahead of lower-scoring sentences. The sentences may be provided with a link to the source document from which they were extracted.

According to certain aspects, a system includes a data store storing unique fact triggers and a query handling system. The query handling system can include at least one processor and a memory storing instructions that, when executed by the at least one processor, cause the query handling system to perform operations. The operations include selecting, from a document repository, documents associated with at least one unique fact trigger and generating entity-sentence pairs for a first entity. The entity may be an entity in a knowledge base storing entities and respective facts. Generating the entity-sentence pairs includes extracting sentences from the selected documents and, for each of at least some of the sentences, identifying a reference to a first entity in the sentence and storing the sentence and an identifier for the document from which the sentence was extracted as an entity-sentence pair for the first entity. The operations also include generating at least one main unique fact cluster for the first entity by clustering the entity-sentence pairs on salient terms and determining a representative sentence for each of the at least one main unique fact cluster. The operations also include providing at least one of the representative sentences in response to a query that identifies the first entity.

According to certain aspects, a method includes selecting documents associated with at least one unique fact trigger. The documents are from a document repository. The method also includes generating entity-sentence pairs from the documents selected. An entity in an entity-sentence pair is from a knowledge base and is associated with a sentence in an entity-sentence pair when the sentence includes a mention of the entity. The method also includes, for a first entity of the entities represented by the entity-sentence pairs, clustering the entity-sentence pairs for the first entity using salient terms occurring in the sentence, the clustering resulting in main clusters, wherein at least one main cluster has a supporting cluster, and determining a representative sentence for each of the main clusters. The method also includes providing at least one of the representative sentences in response to a query that identifies the first entity.

According to certain aspects, a method includes determining that a query relates to an entity in a knowledge base and includes a unique fact trigger, determining that the entity has an associated unique fact list, the unique fact list including sentences extracted from source documents that mention the entity, and providing the unique fact list in response to the query.

According to certain aspects, a method includes determining that a query relates to an entity in a knowledge base and determining that the entity has an associated unique fact list. The unique fact list includes sentences extracted from source documents that mention the entity. The method also includes selecting at least one of the unique facts from the unique fact list and providing the at least one unique fact in response to the query.

In another aspect a system can include at least one processor and memory storing instructions that, when executed by the at least one processor, cause the computing system to perform any of the methods or operations previously described.

In another aspect a tangible computer-readable storage medium having recorded and embodied thereon instructions that, when executed by one or more processors of a computer system, cause the computer system to perform any of the methods or operations previously described.

One or more of the implementations of the subject matter described herein can be implemented so as to realize one or more of the following advantages. As one example, the system may enhance the search results provided by a search engine to include search results that are interesting and insightful facts relating to the subject of the user's query. As another example, the system may work with a digital assistant to provide interesting and insightful facts relating to a context (e.g., location or topic interest). For example, the digital assistant may determine the user is in the vicinity of a particular landmark and provide an interesting fact about the landmark. Such facts may not have been specifically requested, but may be of interest to the user. The facts added to the search results or provided via the digital assistant may be high quality as they are supported by multiple sources. Furthermore, the interesting facts may be pre-computed so that although identification of quality unique facts incurs large amounts of processing power, such facts can be provided as part of a low-latency search result.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
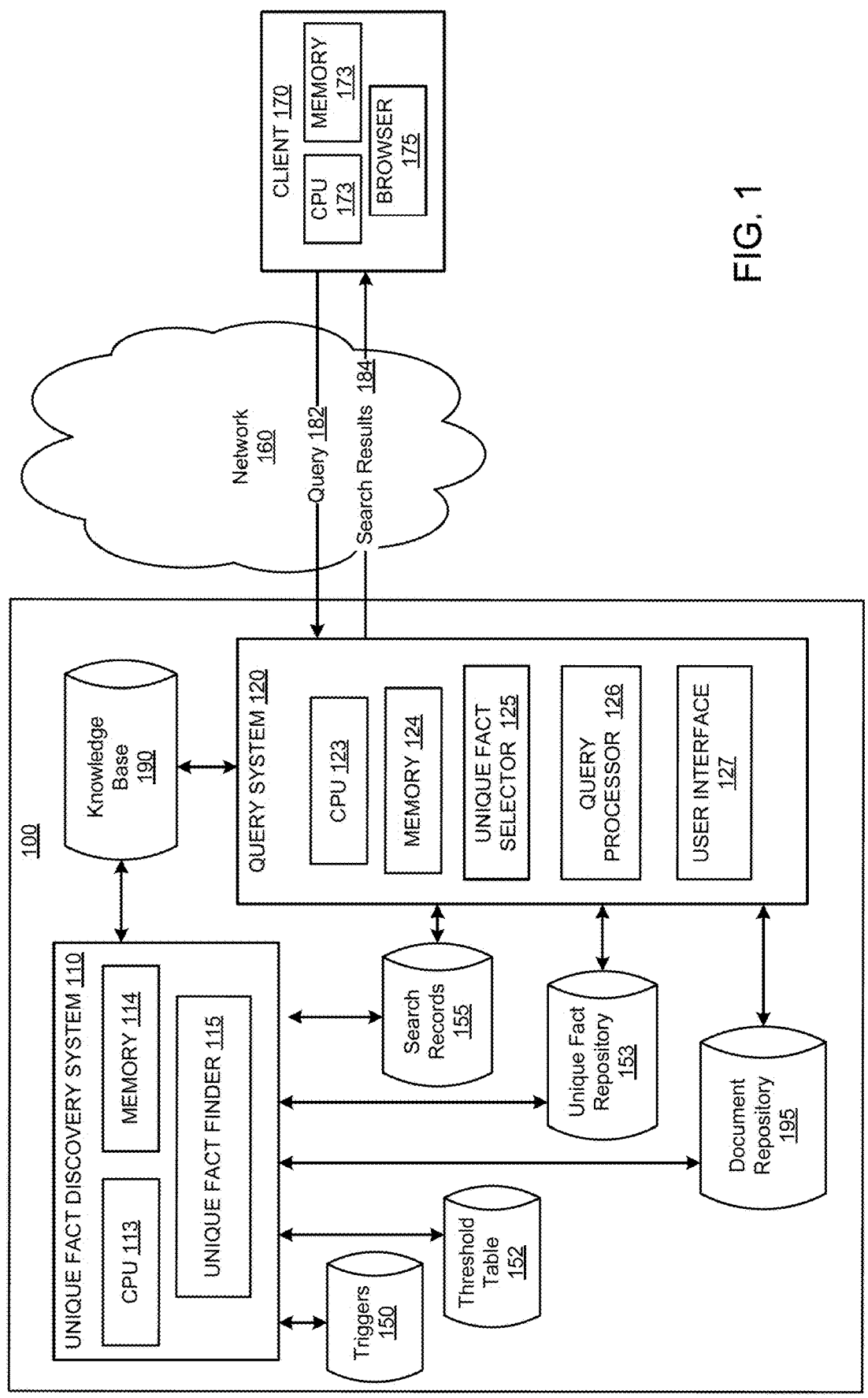
FIG. 1 illustrates an example system in accordance with some implementations.

FIG. 1 is a block diagram of a search system 100 in accordance with an example implementation. The system 100 may be used to implement a search engine that provides unique facts as part of search results for a particular query. The unique facts represent facts that are pertinent to the entity but not generally interesting or pertinent when applied to a large group, e.g., entities of that particular type. Thus, unique facts represent unstructured attributes, or in other words attributes that are not modeled for an entity type in a knowledge base. The depiction of system 100 in FIG. 1 is described as a search engine system that provides search results from an Internet corpus and/or a knowledge base that also provides unique facts in response to a query for a particular entity. Other configurations and applications of the described technology may be used. For example, the unique facts may be used in marketing or other data mining tasks. In some implementations the search engine may search the knowledge base without providing search results from a separate corpus of documents or vice-versa.

Figure 12:
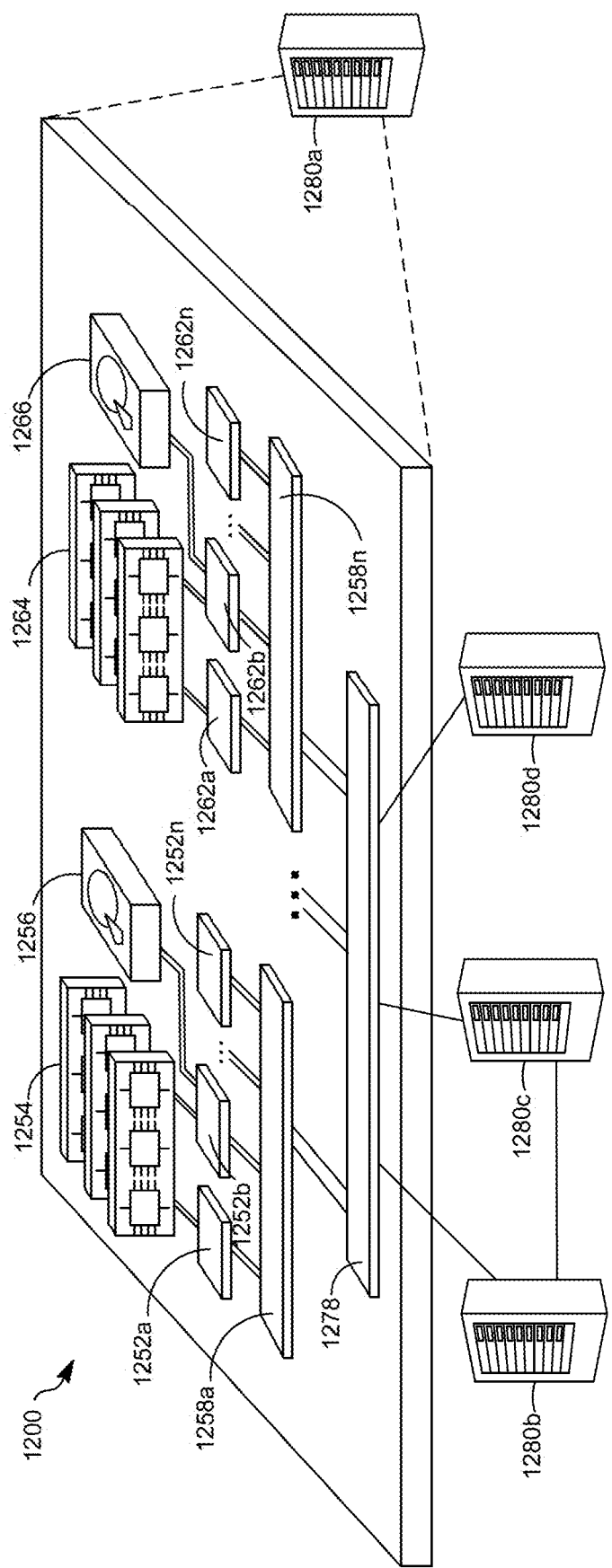
FIG. 12 shows an example of a distributed computer device that can be used to implement the described techniques.

The search system 100 may include unique fact discovery system 110 and query system 120. Unique fact discovery system 110 and query system 120 may be computing devices that take the form of a number of different devices, for example a standard server, a group of such servers, or a rack server system. In some implementations, unique fact discovery system 110 and query system 120 may be a single system sharing components such as processors and memories. In addition, unique fact discovery system 110 and query system 120 may be implemented in a personal computer, for example a desktop or laptop computer. The unique fact discovery system 110 and query system 120 may be examples of computer device 1200, as depicted in FIG. 12.

The search system 100 may include a knowledge base 190. The knowledge base 190 may store facts about entities. In some implementations, the knowledge base 190 may be a data graph, where entities are stored as nodes and facts are stored as relationships between entities or attribute-value pairs for the entities. The edges may be labeled edges and the labels may represent thousands or hundreds-of-thousands of different facts. As used herein, entity may refer to a physical embodiment of a person, place, or thing or a representation of the physical entity, e.g., text, or other information that refers to an entity. For example, an entity may be the physical embodiment of a koala or an abstract concept that refers to a koala. Knowledge base 190 may include an index that allows a query processor to determine entities and attributes of those entities stored in the knowledge base. The search system may also include a document repository 195 that is searchable. For example, document repository 195 may include an index that stores terms or phrases that appear in the documents, as well as the content of the documents or a pointer to the content. In some implementations the document repository 195 represents documents available over the Internet.

The document repository 195 and the knowledge base 190 may be stored on a tangible computer-readable storage device, for instance disk, flash, cache memory, or a combination of these, configured to store data in a semi-permanent or non-transient form. In some implementations document repository 195 and knowledge base 190 may be stored in a combination of various memories and either or both can be distributed over one or more servers. In some implementations, document repository 195 and knowledge base 190 may be stored at a server remove from system 100 but accessible by system 100.

Unique fact discovery system 110 can include one or more processors 113 formed in a substrate and configured to execute one or more machine executable instructions or pieces of software, firmware, or a combination thereof. The unique fact discovery system 110 can include, an operating system (not shown) and one or more computer memories 114, for example a main memory, configured to store data, either temporarily, permanently, semi-permanently, or a combination thereof. The memory may include any type of storage device that stores information in a format that can be read and/or executed by processor 113. Memory 114 may include volatile memory, non-volatile memory, or a combination thereof, and store modules that, when executed by processor 113, perform certain operations. In other implementations, the modules may be stored in an external storage device (not shown) and loaded into memory 114. The modules, such as unique fact finder 115, may enable unique fact discovery system 110 to identify and curate unique facts for various entities that may be stored in unique fact repository 153 or in the knowledge base 190 directly.

For example, unique fact finder 115 may select documents from the document repository as sources of unique facts using triggers 150. Triggers 150 may represent phrases used to identify documents that include fun, interesting or unique facts. For example, triggers 150 may include a list of phrases, such as "fun facts" or "did you know" or "you might not know" etc. A phrase is one or more words. Such phrases may be indicative of or accompany unusual or unique facts. In some implementations these phrases may be whitelist phrases and the triggers 150 may include blacklisted phrases, such as "fake," "false," "propaganda," "lies" "bad facts" "myths," etc. Such blacklisted phrases are indicative of content that are less likely to include reliable facts. In some implementations these phrases in triggers 150 can be machine learned using a preselected set of documents having fun or interesting facts as a positive training examples and documents lacking fun/interesting facts or having bad facts or myths as negative training examples. The unique fact finder 115 may select documents from the document repository 195 that are unique fact sources. The unique fact finder 115 may select a document from the document repository 195 as a unique fact source when it has been included in documents responsive to a query that includes a whitelisted trigger phrase. In this case the query may be considered as pointing to the document. The unique fact finder 115 may identify the queries and responsive documents using search records 155. The unique fact finder 115 may also consider a document from the document repository 195 to be a unique fact source when another document includes at least one link to the document, the link having text associated with one or more whitelisted trigger phrases. In other words, if a first document includes an anchor tag pointing to a second document, and the anchor tag includes the phrase "fun facts", the unique fact finder 115 may consider the second document a unique fact source. In this sense the link points to the document.

In some implementations, the system may eliminate or remove a document as a unique fact source when text associated with a link to the document is found to include any of the blacklisted trigger phrases or when the document is identified as responsive to a query that includes a blacklisted phrase. In such implementations, the unique fact finder 115 may consider a document as a unique fact source when pointed to by a query or link that has any of the whitelisted trigger phrases but not by any of the blacklisted trigger phrases.

In some implementations, the unique fact finder 115 may remove low quality documents from the unique fact sources. For example, the unique fact finder 115 may filter out documents with a low PageRank or documents that include objectionable content (e.g., pornographic documents), so that such documents are not considered unique fact sources. As another example, the unique fact finder 115 may filter out documents likely to be blogs or forums. As another example, the unique fact finder 115 may identify as low quality (and thus not a unique fact source) any syndicated, duplicated, or plagiarized documents, e.g., using fingerprinting technology. Such documents merely repeat content of other documents and do not offer independent sources of unique facts and can artificially skew the support for a fact.

Once unique fact finder 115 identifies documents that are unique fact sources, the unique fact finder 115 may extract sentences from the documents. In extracting the sentences, the unique fact finder 115 may focus on the body of a document. The body is the core, central, or essential portion of the document and excludes any comments section, menu headers, side menus, etc. The fact finder 115 may perform semantic analysis on the sentences in the core portion of the unique fact sources to identify entity mentions in the sentences. Semantic analysis is a step in natural language processing. For example, given a particular free-text document, such as a web page, understanding the semantics of text in the web page may involve several types of analysis, such as noun-phrase segmentation, entity tagging, and reference resolution using known or later developed techniques for such analysis. A sentence may mention an entity directly or may refer to an entity via a pronoun. Moreover, the same sentence may mention more than one entity. For example, the unique fact finder 115 may determine that the sentence "Moby Dick was written by Herman Melville" to mention the entities *Moby Dick* and Herman Melville, as well as more general entities, such as Book and Author.

In some implementations, the unique fact finder 115 may generate entity-sentence pairs, where a sentence is paired with each entity found to be mentioned by the sentence. In some implementations, the unique fact finder 115 may exclude entities below a topicality threshold from the entity-sentence pairs, e.g., so that the unique fact finder 115 does not pair the entity with the sentence. The topicality score for an entity-sentence pair may be determined with respect to the sentence or with respect to the document during the semantic analysis of the source document. A document topicality score represents the topicality of the entity to the document as a whole. If the entity is the main topic of the document, the document topicality score will be high, for example approaching 1.0 on a scale of zero to one. In some implementations, a semantic importance score represents the topicality of the entity to the sentence. For example, the source document may be about cats, but a sentence may compare a unique fact about a dog to cats, e.g., "a dog's sense of smell is 100× more sensitive than a cat's". The semantic importance score may be used to meet the topicality threshold. The topicality score for an entity-sentence pair may be determined based on the document topicality score, the semantic importance score, or a combination of these. The topicality threshold that the entity needs to meet may depend on the type of entity. For example, the unique fact finder 115 may require entities that represent broad a category, such as book, country, movie, to meet a higher topicality threshold than entities that are specific, such as *Australia* or *Moby Dick*. In some implementations, the system may include threshold table 152 to account for the different thresholds. Threshold table 152 may include topicality thresholds for specific entities. If an entity exists in the threshold table 152 then the threshold score for the entity must meet or exceed the threshold in the threshold table 152 for that entity. Otherwise, the unique fact finder 115 may use a default threshold that applies to entities that do not have an entry in the threshold table 152. In this manner the system can set a higher topicality threshold for some entities but use a lower default threshold for all other entities. In implementations that filter entities based on topicality, the unique fact finder 115 only generates entity-sentence pairs for entities with a topicality score that meets or exceeds the appropriate topicality threshold. In some implementations the entity-sentence pairs are stored, e.g., in unique fact repository 153 or in the knowledge base 190 itself. The entity-sentence pairs may be stored with additional information, such as an indication of the source document (e.g., the URL for the source document) from which the sentence was extracted, and the topicality score of the entity for that sentence.

In some implementations, the unique fact finder 115 may tag and, optionally filter out, bad sentences. The unique fact finder 115 may consider poorly written sentences and/or sentences that need context as bad. A sentence may need context because it uses pronouns, although in some implementations, the unique fact finder 115 may not consider a sentence bad just because it uses a pronoun to refer to the entity it is paired with. A sentence may also need context when the sentence includes terms like "later" or "then" in the first clause. The unique fact finder 115 may mark or flag such entity-sentence pairs as bad, but may keep the entity-sentence pair. In some implementations, the unique fact finder 115 may remove certain prefixes from the sentences before storing the entity-sentence pair, for example removing terms like "However," or "In addition,". Such prefixes may not require context, but may not make sense when presented as a query result. In some implementations, the unique fact finder 115 may mark these sentences as bad, but this can reduce the number of unique facts identified and presented as search results.

In some implementations, the unique fact finder 115 may filter out sentences that are likely already represented in the knowledge base 190 as structured facts. For example, sentences that match certain patterns, such as "X is friends with," "X is married to," or "X was born on" where X represents the entity mention, may be removed from the entity-sentence pairs because these sentences do not likely represent unique facts. Rather, such sentences represent structured facts. The patterns for identifying sentences that are likely structured facts may be hand curated and stored as part of the system 100.

In some implementations, the unique fact finder 115 may refine the entity-sentence pairs for an entity via clustering and ranking. The unique fact finder 115 may cluster the sentences for an entity that say the same thing but in slightly different ways. Clustering enables the system to avoid showing duplicate or near duplicate facts in a search result and enables the system to accumulate support across sentences expressing the same fact, which is an indication of a fact's correctness and uniqueness. In some implementations, the unique fact finder 115 may cluster the sentences by salient terms, where each sentence in the cluster has an equivalent set of salient terms. A salient term is any term in the sentence that is not a stop word (such as "the", "a", "and", or other words the unique fact finder 115 considers unimportant). A first salient term is equivalent to another salient term if they are the same term after lemmatization (e.g., play and playing are the same after lemmatization), if one is a synonym of the other, or if both terms are numeric. Thus, "three" and "four" may be equivalent salient terms for the purposes of clustering. In some implementations, numeric terms may be equivalent if the values are both less than a maximum value. For example, if both values are less than 100 the terms may be equivalent but not equivalent if one or both exceed the maximum value (e.g., 100). For two sentences to be included in the same cluster, each term in the set of salient terms for a first sentence must have an equivalent term in the set of salient terms for a second sentence and vice/versa. These clusters are considered main clusters. In some implementations, there need not be a minimum requirement on the size of the cluster. For example, a main cluster could include only one sentence. In some implementations, the system may require a minimum size when combined with sentences from a support cluster. In such systems the main cluster may include one sentence when a supporting cluster includes at least one sentence (or at least three sentences, etc.), for example.

The unique fact finder 115 may also identify support clusters for one or more of the main clusters. A support cluster includes sentences having a subset of the salient terms of a sentence in the main cluster. A sentence could be in multiple supporting clusters, but a sentence in a supporting cluster may not be a representative of the main cluster.

In some implementations, the unique fact finder 115 may rank the entity-sentence pairs. The ranking may be done in conjunction with or independently of clustering. The unique fact finder 115 may calculate a sentence score for each sentence in the entity-sentence pairs. In some implementations, only sentences not marked as bad may have a score calculated. The sentence score may be based on a number of factors. One of the factors may be the topicality of the entity for the source document. As discussed above, this document topicality score may be used to filter out entity-sentence pairs and may be stored with the entity-sentence pair. Another factor may be a rank for the source of the sentence (e.g., a PageRank score). In some implementations, the unique fact finder 115 may multiply the document topicality score by the rank for the source document to calculate a confidence factor for the entity-sentence pair. Another factor may be the length of the sentence, e.g., in characters or words. The length factor may be a demotion factor that demotes sentences that are too short or too long. In some implementations, too short or too long may be measured against a center point, such as 140 characters or 20 words, for example. The further a length of a sentence strays from the center point, the higher the demotion. Another factor may be a promotion factor that measures the fun-quotient of the source document. For example, the more inbound links for the source document that include whitelisted trigger phrases or synonyms of the whitelisted trigger phrases, the higher this promotion factor is.

Another factor may be an inverse document frequency score for the sentence. The unique fact finder 115 may determine the inverse-document-frequency (IDF) score for each term in the sentence and may select the highest IDF score of any term in the sentence as the IDF score for the sentence. The IDF score represents how rare a term is across a corpus of documents, thus terms that occur less frequently across the corpus have a higher IDF score than very common terms. The IDF score for a sentence may be a demotion factor where low IDF scores represent a demotion. In some implementations, one or more of the entity-sentence pairs may be rated by an external rater (a human) for an interestingness factor. This factor is subjective to the rater and represents a promotion factor, so that uninteresting sentences may be given an interestingness score of zero. This factor, when provided, may be included in the score for the sentence and represents a promotion factor.

In some implementations, the unique fact finder 115 may combine one or more of the factors to compute a sentence score. For example, the sentence score may be the product of each of the factors used to compute the score or a sum of the factors. In some implementations, one or more of the factors may have a weight applied, so that that factor counts more than another in calculating the sentence score. The exact combination of factors must be consistent across sentences, but implementations include various combinations of the factors as outlined above.

In some implementations, the unique fact finder 115 may store the sentence score with the entity-sentence pair. In some implementations, the unique fact finder 115 may use this score to select sentences to show in response to a query for the entity. In some implementations where the sentences are clustered, the unique fact finder 115 may use this score to select a representative sentence from each main cluster and/or to rank the clusters. For example, the sentence in a main cluster that has the highest sentence score may be selected as the representative sentence for the main cluster. In some implementations, the representative sentences may be displayed in response to a query for the entity in order of decreasing sentence scores. In some implementations, the representative sentences may be displayed in a random order, but the sentence score can be used to influence the probabilities used in randomization. In some implementations, the system may choose one of the representative sentences randomly for display in response to a query.

The unique fact finder 115 may also rank the main clusters by calculating a cluster score. The cluster score may be a combination of the sentence scores for sentences that are in the main cluster and in the supporting cluster. The combination may be a sum of the sentence scores, but could also be some other combination, such as an average or a product. In some implementations, the sentence scores for sentences in the supporting cluster may be down weighted in the combination. In some implementations, the unique fact finder 115 may exclude syndicated or duplicated content within the cluster prior to calculating the cluster score. For example, the unique fact finder 115 may determine if the sentences occurring prior to or after a lower scoring sentence in the cluster match a higher scoring sentence in the cluster, the unique fact finder 115 may exclude that sentence from the cluster score calculation. The unique fact finder 115 may store the cluster assignment, e.g., in unique fact repository 153 and may store the cluster score for each cluster. In some implementations, this score may be used to determine which sentences to display. For example, the system may use the cluster score instead of the sentence score for the representative sentences to determine which sentences to display and/or an order for displaying the representative sentences.

The system 100 may also include search records 155. Search records 155 may include search logs, aggregated data gathered from queries, or other data regarding the search terms and search results of previously processed queries. Certain data in the search records 155 may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. In some implementations, the search records 155 may be generated by query system 120 in the normal process of generating search results 184.

The system 100 may also include query system 120. Like unique fact discovery system 110, query system 120 may include one or more processors 123, an operating system (not shown) and one or more computer memories 124. Query system 120 may include modules, stored in memory 124 or an external storage device (not shown) and loaded into memory 124 that enable the query system 120 to receive and respond to queries. For example, the modules may include a unique fact selector 125, a query processor 126, and a user interface 127. Query processor 126 may receive queries from requestors, such as client 170, analyze the query to determine how to search indexes for knowledge base 190 and document repository 195, and initiate the search of the indexes. Query processor 126 may also receive search results, compile and format the results, and determine what results to return to the requestor. In some implementations, query processor 126 may work with user interface 127 to provide data used to display the search results. Query processor 126 may also work with unique fact selector 125 to present one or more unique facts in response to the query. Unique fact selector 125 may receive an indication of an entity, for example from query processor 126, and provide one or more entity-sentence pairs from the unique fact repository 153 for that entity. In some implementations, the unique fact repository 153 may be included in the knowledge base 190 and search for common connections between the two entities in the knowledge base 190.

Query system 120 may include one or more servers that receive queries 182 from a requestor, such as client 170, and provide those queries to the query system 120. The query system 120 may be responsible for searching document repository 195, knowledge base 190, and potentially other data sources for results responsive to the query 182. Search results may include information from documents responsive to the query or information for entities responsive to the query. For example, the query system 120 may receive a query 182 from a client, such as client 170, perform some query processing using query processor 126, and retrieve results from document repository 195 and knowledge base 190. In addition, the query processor 126 may work with unique fact selector 125 to identify unique facts associated with an entity from the query 182.

The query processor 126 may obtain search results from the various sources and provide the compiled results 184 to client 170 through user interface 127. Query system 120 may be in communication with client(s) 170 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the query system 120 may communicate with and transmit data to/from clients 170. Although illustrated as separate systems, in some implementations one or more components of the unique fact discovery system 110 may be included in the query system 120. Additionally, components of one or more of the modules described may be combined with another module, or may be included in a separate module. Thus the configuration of the example of system 100 is an example configuration and implementations may include other configurations not shown.

Figure 2:
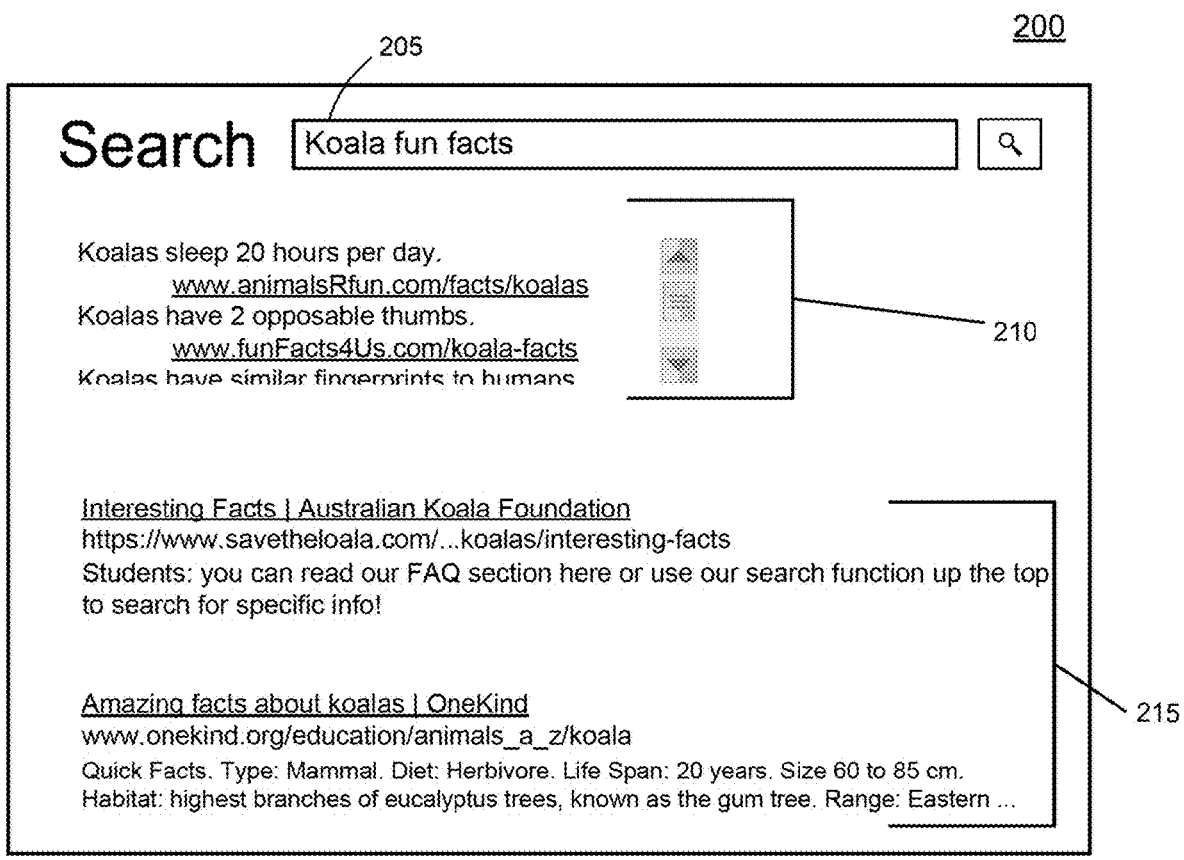
FIG. 2 illustrates a representation of a user interface showing unique facts in response to a query for an entity, in accordance with some implementations.

FIG. 2 illustrates an example of a user interface 200 showing a unique fact returned in response to a query for an entity that requests such facts, in accordance with some implementations. A query system, such as query system 120 of FIG. 1, may generate information used to display user interface 200 in responding to queries from client 170. In the example of FIG. 2, a user has submitted a query 205 of "koala fun facts." A query processor, such as query processor 126 of FIG. 1, may determine that the query 305 relates to the entity koala in the knowledge base and also includes a trigger phrase, e.g., a whitelisted trigger phrase. This may be an indication to the query processor to obtain unique facts for the entity koala, e.g., from unique fact repository 153. Because the query 205 includes the trigger phrase the query processor may not search the knowledge base directly, because the knowledge base includes mostly structured facts that are not unique or particularly interesting. The unique facts may be returned as a scrollable list 210. In the scrollable list 210, each fact may include an indication of the source of the fact. The indication may be a link to the source document. In some implementations, the facts in the scrollable list 210 are representative sentences from clusters, as described above. In some implementations the unique facts are displayed in a random order and in some implementations they are displayed in an order determined by a sentence score or the cluster score. In addition to the scrollable list 210 of unique facts, the search results may include a list of documents 215 responsive to the query, using conventional search techniques. The scrollable list 210 may appear in a position of prominence with regard to the list of documents 215.

Figure 3:
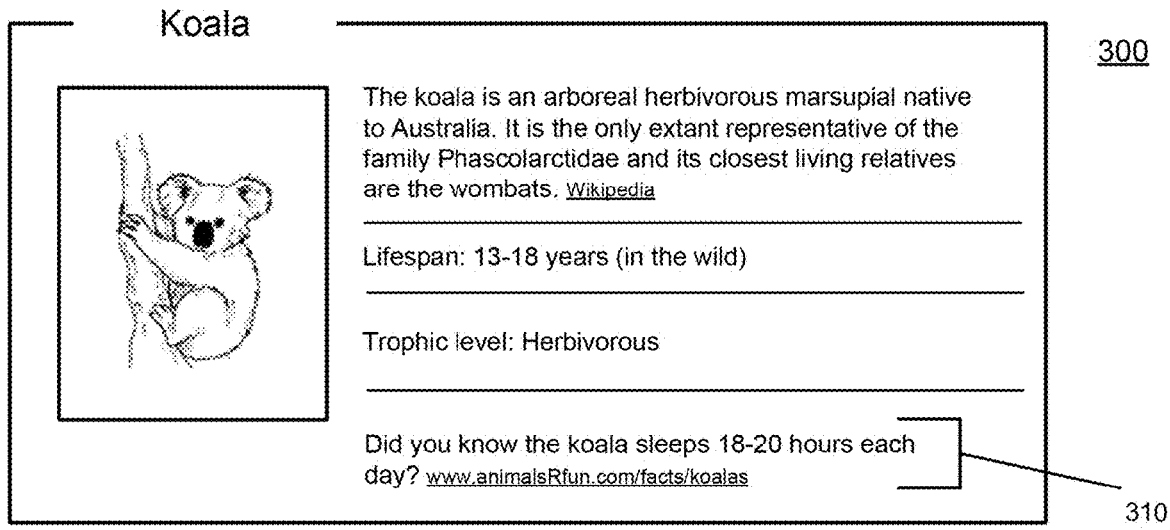
FIG. 3 illustrates an example of a user interface showing a unique fact in response to a query for an entity, in accordance with some implementations.

FIG. 3 illustrates an example of a user interface 300 showing a unique fact returned in response to a query for an entity, in accordance with some implementations. A query system, such as query system 120 of FIG. 1, may generate information used to display user interface 300 in responding to queries from client 170. In the example of FIG. 3, a user has submitted a query of "koala." A query processor, such as query processor 126 of FIG. 1, may determine that the query relates to the entity koala in the knowledge base. This may be an indication to the query processor to obtain facts about the koala entity from the knowledge base. In addition the facts from the knowledge base, the query processor may also obtain a unique fact 310 for the entity, e.g., from unique fact repository 153, if any exists, for the entity. In some implementations the unique fact 310 may be selected at random. In some implementations, the unique fact 310 may be a representative sentence from a cluster. In some implementations, each time a search result is provided for the query a different unique fact appears. The order of appearance may be random or may be based on a sentence score or cluster score showing highest-scoring sentences first. In some implementations, the unique fact 310 may be one of several facts displayed as a scrollable list, such as list 210 of FIG. 2. The unique fact 310 may include an indication of the source of the fact. The indication may be a link to the source document.

Figure 4:
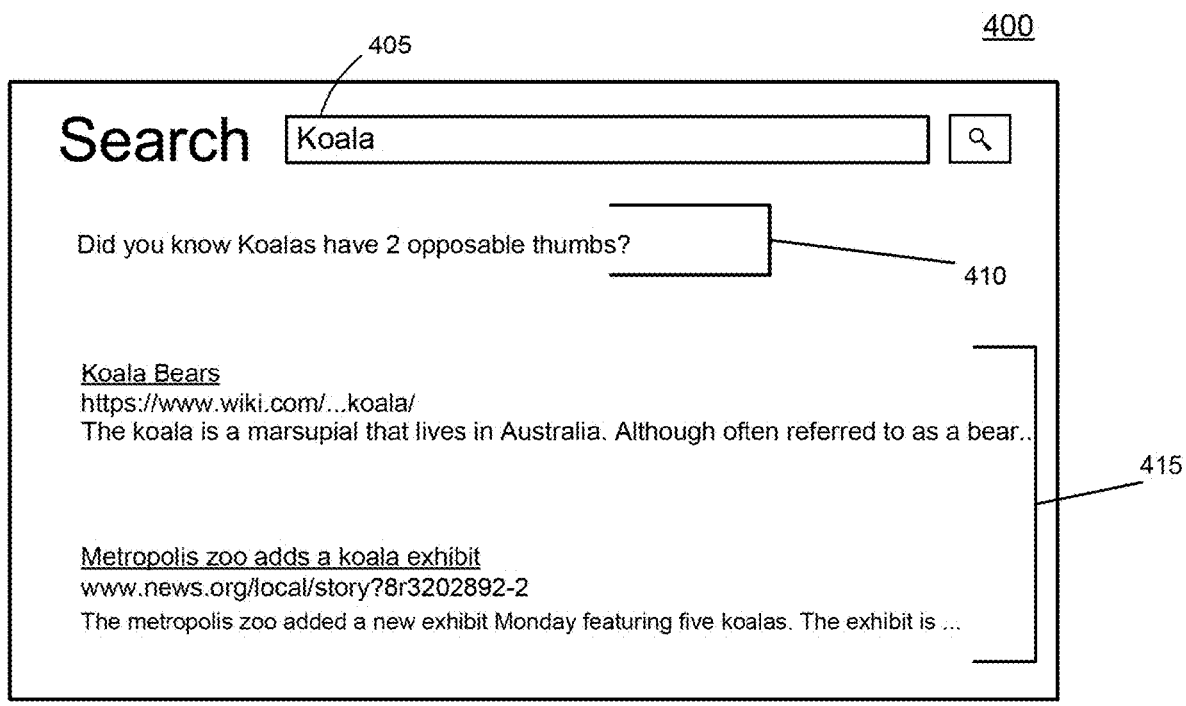
FIG. 4 illustrates a user interface showing a unique fact and responsive documents in response to a query for an entity, in accordance with some implementations.

FIG. 4 illustrates an example of a user interface 400 showing a unique fact returned in response to a query for an entity, in accordance with some implementations. A query system, such as query system 120 of FIG. 1, may generate information used to display user interface 400 in responding to queries from client 170. In the example of FIG. 4, a user has submitted a query 405 of "koala" but without any trigger phrases. A query processor, such as query processor 126 of FIG. 1, may determine that the query relates to the entity koala in the knowledge base. This may be an indication to the query processor to optionally obtain a unique fact about the koala. The interface of FIG. 4 is similar to that of FIG. 2 in that it includes a list of documents 415 responsive to the query, but the interface 400 only includes one unique fact 410 rather than a scrollable list. The unique fact 410 may be selected at random so that each time a query for the entity koala is received the fact 410 displayed changes. Alternatively, a different fact 410 may be displayed starting with a highest scoring fact. In some implementations, the fact displayed may be a representative fact.

Figure 5:
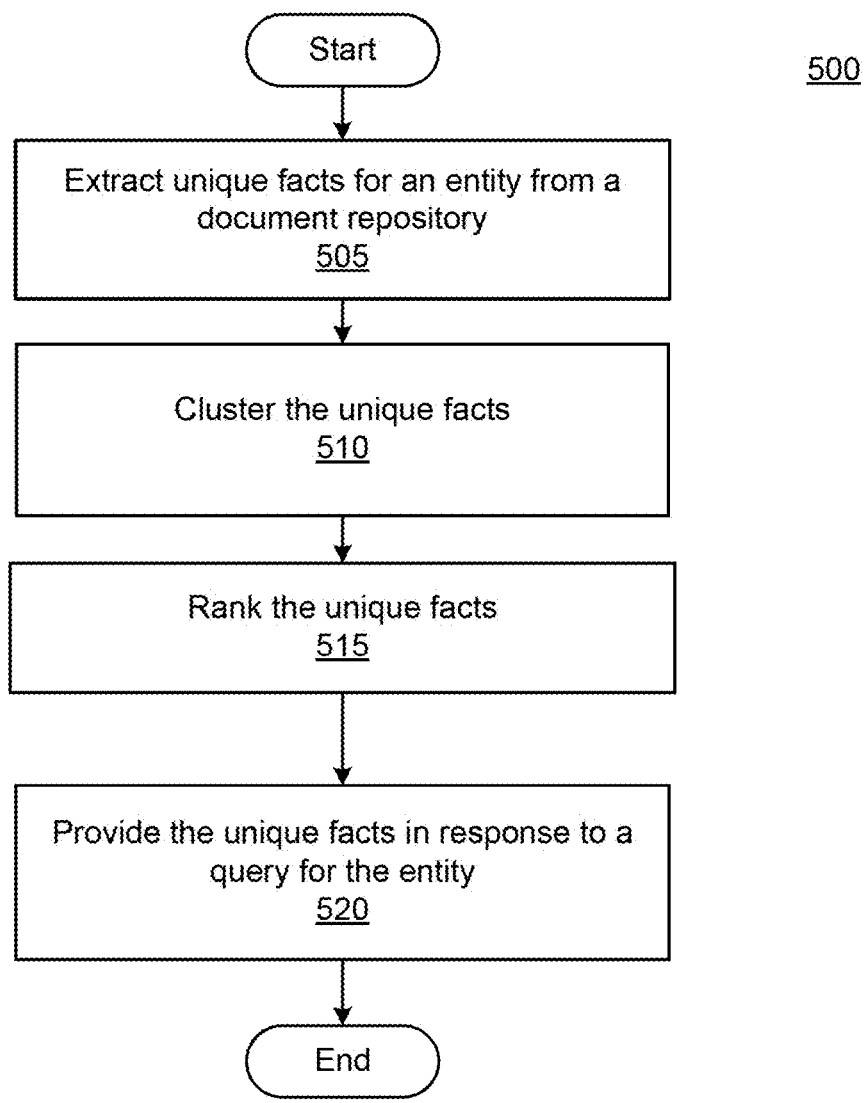
FIG. 5 illustrates a flow diagram of an example process for identifying, selecting, and providing unique facts in response to a query, in accordance with some implementations.

FIG. 5 illustrates a flow diagram of an example process 500 for identifying, selecting, and providing unique facts in response to a query, in accordance with some implementations. Process 500 may be performed by a system, such as search system 100 of FIG. 1. While process 500 is described with regard to a single entity for ease of discussion, the system 100 may execute portions of process 500 for many entities concurrently.

Process 500 may begin by extracting unique facts for an entity (505). The system may extract unique facts for multiple entities at a single time, as extracting facts includes analyzing documents for any entity mentions, as illustrated in more detail by FIG. 6. Each unique fact may be represented as an entity-sentence pair, with the sentences being extracted from documents identified as unique fact sources. The system may then cluster the unique facts for the entity (510). The clustering may be configured to group the sentences so that sentences that say the same thing about the entity are put in the same cluster. FIG. 7 illustrates one example clustering method. The system may also rank the unique facts (515). Ranking the unique facts may include assigning a sentence score to each unique fact (e.g., each entity-sentence pair) and, if the sentences are clustered, calculating a cluster score for each cluster. Ranking the unique facts is described in more detail with regard to FIG. 8. The system may also provide one or more of the unique facts in response to a query for the entity (520). The query may be a query that expresses interest in unique facts for the entity, for example by including a trigger phrase, e.g., the whitelisted trigger phrases stored in triggers 150 of FIG. 1. Such trigger phrases include "fun facts," "did you know," "you might not know," "oddities," etc. The query may also just identify the entity. In some implementations the quantity of unique facts provided in response to the query may depend on whether the query includes a trigger phrase.

In process 500, steps 505 to 515 may occur on a periodic basis, for example nightly, bi-weekly, weekly, monthly, etc., as a batch or offline process. Steps 505 to 515 generate the entity-sentence pairs that can be used in response to queries, e.g., as part of step 520. Thus, step 520 may occur independently of, but subsequent to at least one execution of, steps 505 to 515.

Figure 6:
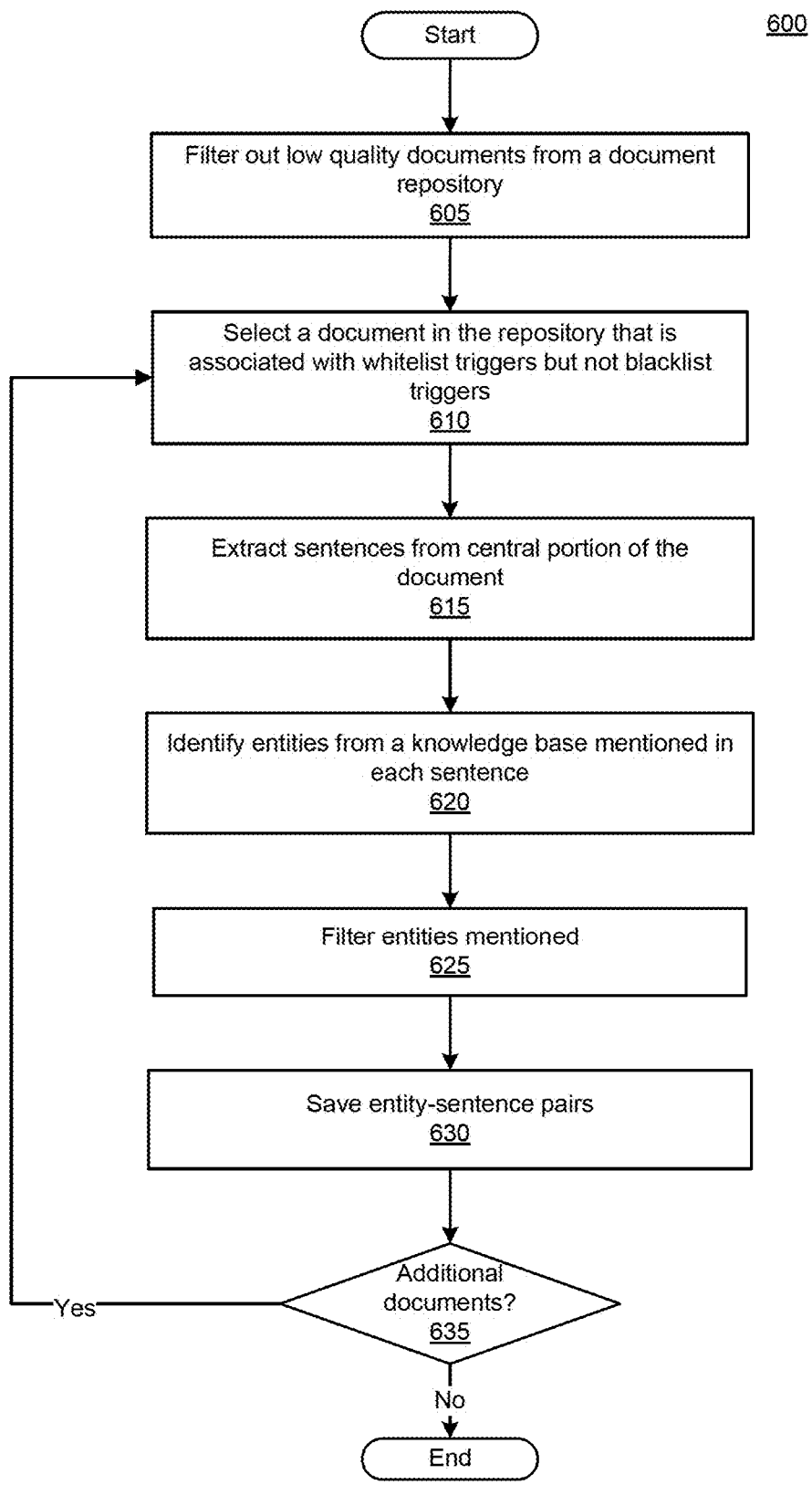
FIG. 6 illustrates a flow diagram of an example process for identifying unique facts for entities, in accordance with some implementations.
Figure 7:
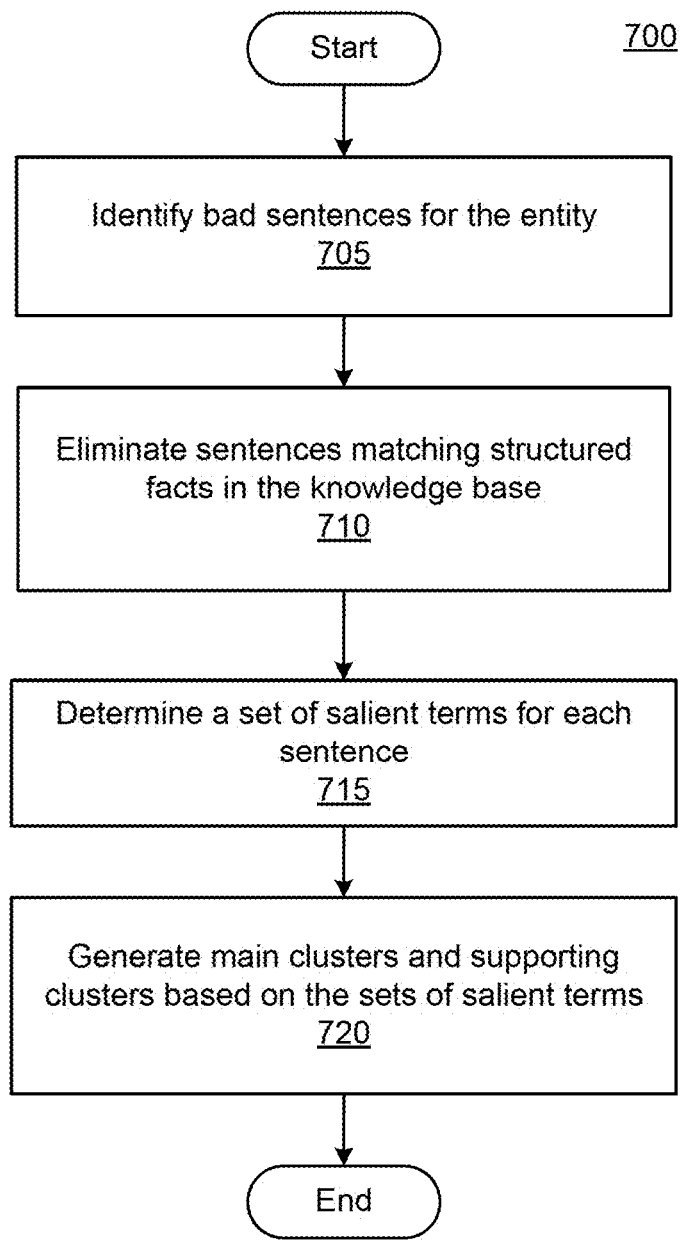
FIG. 7 illustrates a flow diagram of an example process for clustering sentences that represent unique facts for an entity, in accordance with some implementations.

FIG. 6 illustrates a flow diagram of an example process 600 for identifying unique facts for entities, in accordance with some implementations. Process 600 may be performed by a system, such as search system 100 of FIG. 1, as part of step 505 of FIG. 5. Process 600 identifies and examines unique fact source documents from a corpus and generates entity-sentence pairs for a subset of entities identified in the unique fact source documents. Thus process 600 may generate entity-sentence pairs for multiple entities. Process 600 may begin by filtering out low-quality documents from a document repository (605). In some implementations, the document repository is documents available on the Internet. The document repository may include web pages, PDF documents, documents in a spreadsheet or word processing format, images (images may be associated with text from an image tag or may have recognition performed to identify text within the image itself), etc. The system may use various criteria in identifying low-quality documents. In some implementations, the criteria may include a query-independent document rank, such as a PageRank score. A PageRank score is a reflection of how many other documents link to the document and may include other factors. A low PageRank score may be an indication of a low-quality document. The criteria can also include classifications. For example, the system may consider documents classified as pornography to be low-quality documents. Likewise documents classified as blogs or forums may be considered low-quality. Blogs and forum are likely to include more opinions than facts and less likely to have reliable facts. The system may also consider documents classified as syndicated or plagiarized as low quality. The content of documents classified as syndicated or plagiarized is duplicated from other documents. For example, a web site may be a collection of news stories from news organizations. The system may consider such documents as lacking original content and, therefore, low-quality. Another criteria used by the system to identify low-quality documents may be blacklisting. For example, a document or a domain may be added to a list and any documents in the list (e.g., specifically identified or matching a domain) are considered low-quality. Such a list may be manually curated. The system may ignore low-quality documents so that they are never considered as unique fact sources.

The system may select a document (that is not a low-quality document) that is associated with unique-fact triggers (610). The unique-fact triggers may be phrases indicative of unique or unusual facts. For example, interesting facts can be introduced by the phrase "did you know" and so this may be a trigger phrase. Other such trigger phrases include "fun facts," "interesting facts," etc. Documents that are associated with such trigger phrases may be considered unique fact sources. The system may consider a document associated with a trigger phrase in a variety of ways. For example, in some implementations, the document may be pointed to by links from other documents that include a trigger phrase. For example, if a first document has a link to the second document and the link is associated with (e.g., via anchor tag text or a sentence that introduces the link) with the text "fun facts about koalas," the second document is associated with the trigger phrase and considered a unique fact source. Text associated with links to a document is considered more reliable than text in the document itself, but in some implementations the text may come from the document itself. As another example, if the document appears in a search result for a query that includes a trigger phrase, the document is associated with the trigger. The query and its search results may be stored, e.g., in anonymized search records. Thus, if the document is pointed to by text (e.g., via a query or by a link) that includes a trigger phrase, the system may consider the document a unique fact source.

In some implementations these trigger phrases may be whitelisted trigger phrases and the trigger phrases may include blacklisted trigger phrases. For example, "fun fact" may be a whitelisted trigger phrase and "lies" or "myth" may be a blacklisted trigger phrase. In such implementations, the system may only consider a document a unique fact source when it is pointed to by text that includes any whitelisted trigger phrase but not pointed to by any text that includes a blacklisted trigger phrase. Thus, for example, if a particular document is associated with a query for "koala fun facts" but is also associated with a link having the text "koala myths" the system may not consider the particular document a unique fact source. The whitelisted and blacklisted trigger phrases may be hand curated.

The system may extract sentences from the core portion of a document that is a unique fact source (615). The core portion includes the main content of the document, but excludes portions such as comments, advertisements, menus, side-bars, etc. The system may, for each sentence identified in the core portion, identify one or more entities mentioned in the sentence (620). The entities are entities that exist in a knowledge base and, thus, have an identifier from the knowledge base. The system may identify entities using known or later discovered entity mention techniques. Using such techniques the system may identify entities in pronouns as well as in nouns or noun phrases used in the sentence. In addition, the system can identify more than one entity for a particular noun. For example, in the sentence "cat urine glows under black light" may identify the entities cat and animal in the sentence as well as the entity urine.

In some implementations, the system may filter the entities mentioned using a topicality score based on a document topicality score and/or a semantic importance score (625). The document topicality score is a function of the entity and the document the sentence appears in and represents how meaningful the entity is to the document as a whole. For example, if the source document for the sentence about cat urine is about cats, the entity cat will have a high document topicality score and urine will be lower. If, however, the document is about urine, the urine entity will have a higher document topicality score. The system may also filter entities using a semantic importance score, which represents the topicality of the entity to the sentence. For example, the source document may be about cats, but a sentence may compare a unique fact about a dog to cats, e.g., "a dog's sense of smell is 100× more sensitive than a cat's". The semantic importance score of the entity dog may be high for this sentence, but the document topicality score may be lower. The topicality score for an entity-sentence pair may be determined based on the document topicality score, the semantic importance score, or a combination of these. In some implementations if either the document topicality score or the semantic importance score satisfies the threshold the system may determine the topicality score satisfies the threshold. The system may filter out any entities for the sentence that have a topicality score that fails to satisfy a topicality threshold. The topicality threshold may be variable and dependent on the type of the entity. For example, entities classified as categories, e.g., animal, country, etc., may have to meet a higher topicality threshold than other entities. As another example, the system may include a topicality table that stores the topicality threshold for specific entities. For example, the topicality table may have an entry for the entity animal with a topicality threshold of 0.80 and another entry for the entity country with a topicality threshold of 0.85. In such implementations, if an entity is not identified in the topicality table, the system may use a default topicality threshold (e.g., 0.60). Thus, the topicality threshold can be variable and dependent on the entity. If the topicality score of an entity does not meet the topicality threshold for that entity the system may ignore the entity, i.e., so that it does not get paired with the sentence.

For each sentence extracted and for each entity identified in the sentence that is not filtered out (e.g., due to failure to reach the topicality threshold), the system may save the entity and sentence as an entity-sentence pair (630). In some implementations, the system may save other information with the entity-sentence pair, for example the topicality score for the entity and an identifier for the source document from which the sentence was extracted. Other information may also be stored with the sentence-entity pair.

The system may continue processing documents in the repository (635, Yes), repeating steps 610 to 630 for other unique fact source documents until the documents have been processed (635, No). Process 600 then ends. Having identified unique facts for entities, represented as the entity-sentence pairs. In some implementations, these pairs can be provided in response to search queries. In some implementations, the system may perform additional processing to cluster, and/or rank the pairs.

FIG. 7 illustrates a flow diagram of an example process 700 for clustering sentences that represent unique facts for an entity, in accordance with some implementations. Process 700 may be performed by a system, such as search system 100 of FIG. 1, as part of step 510 of FIG. 5. Process 700 clusters sentences with the goal of grouping sentences that express the same fact but in a different manner together. Such clusters enable the system to avoid or minimize displaying duplicate unique facts and to select a best expression of a fact. However, in some implementations clustering is optional. Process 700 is discussed for a single entity but a system may perform process 700 for each entity represented by the entity-sentence pairs.

Process 700 may begin by identifying bad sentences for the entity (705) from among the entity-sentence pairs for the entity. Bad sentences represent sentences that need context to make sense or sentences that are grammatically ill-formed. If the grammar of the sentence is undesirable, the system may flag that entity-sentence pair as bad. Likewise, if the sentence requires outside context the system may flag the entity-sentence pair as bad. Flagging may be done with a field or flag stored with the sentence-entity pair. Sentences flagged as bad can be used to support a similar fact, but will not be considered when selecting a best expression. A sentence that includes phrases such as "later" or "then" in the first clause may be considered in need of outside context.

Likewise, sentences that include unresolved pronouns may be considered in need of outside context. A pronoun is resolved in the sentence, and thus not in need of outside context, when the noun it refers to is included in the sentence. For example, the sentence "The koala gave the kangaroo his banana" includes a resolved pronoun his that refers back to the noun koala in the sentence. The system would not consider such a pronoun to be unresolved. In some implementations, the system may also not consider sentences where the only pronoun refers to the entity, i.e., the entity of the entity-sentence pair, as unresolved. Such sentences would not need outside context when displayed in response to a query for the entity.

Similarly, a sentence that includes nouns referred to elsewhere in the document by a proper noun may be considered in need of outside context. For example, the sentence "Tom Hanks played the lead in the movie" does not include a pronoun, but the noun "movie" is ambiguous when presented by itself. However, the sentence "Sully opened last weekend and Tom Hanks played the lead in the movie" does not need outside context because the proper noun that "the movie" refers to is included in the sentence. Similarly, if the noun referred to elsewhere in the document by a proper noun is the topic entity for the sentence, e.g., "The movie set box-office records its opening weekend," the sentence is not in need of outside context because no outside context is needed when the sentence is displayed in response to a query for the topic entity, e.g., Star Wars.

In some implementations the system may consider sentences that start with phrases like "however," "also," or "in addition" as in need of outside context. In other implementations, the system may remove such phrases, which may appear as prefixes for or as insertions in the sentence, from the sentence, and will not consider the sentence in need of outside context. In such implementations the sentence is not flagged as bad. In some implementations, sentences may be identified as bad as part of identifying entities in the sentence, e.g., as part of step 620 of FIG. 6.

The system may also eliminate sentences that match a structured fact in the knowledge base (710). Such sentences may be removed from the entity-sentence pairs altogether instead of just being marked as bad. Sentences that match a pattern of a structured fact do not represent unique facts, as such facts are modeled and, thus, common to a number of different entities. The patterns may be regular expressions, such as "X is friends with" and "X was born on" or "X lives (in | on)". The patterns may be manually curated or may be generated automatically based on the facts in the knowledge base. A sentence that matches one of the patterns may be filtered out so that it is not used in clustering or ranking. In some implementations, such pairs may be eliminated as part of identifying entities in the sentence, e.g., as part of step 620 of FIG. 6.

The system may determine a set of salient terms for each sentence (715). The salient terms exclude stop words, such as "the", "a" "of", forms of the verb "to be", etc., as well as the term(s) that refer to the entity, e.g., the entity of the entity-sentence pair. Terms that mention an entity other than the entity represented by the entity-sentence pair are included in the set of salient terms. The system may generate lemmas of the salient terms for the set of salient terms. The lemma represents a single version of different variants of a term. For example, plural terms may be changed to the singular form so that the singular form is saved in the set of salient terms. Likewise, verb conjugations may be converted to a base conjugation, so that "revolves" and "revolved" become "revolve" in the set of salient terms.

The system may then generate clusters using the salient terms (720). In some implementations, the system may generate main clusters and supporting clusters. The main cluster may include sentences with equivalent sets of salient terms. Thus, a salient term set T is equivalent to a second set of salient terms S if each term in T has an equivalent term in S and vice versa. A salient term A is equivalent to another salient term B when A and B are the same, A is a synonym of B, or A and B are both numeric values. As indicated above in some implementations, the numeric values must both be below some maximum value. A supporting cluster may support a main cluster. The system may put a sentence in a supporting cluster of a main cluster when the set of salient terms for the sentence is a subset of the set of salient terms for the main cluster. Sentences may appear in many supporting clusters but may only appear in one main cluster. Sentences in the supporting clusters are not considered as the best expression of a fact. The generation of clusters using salient terms as described above is one example of generating clusters and implementations may use other methods. Once entity-sentence pairs are assigned to a cluster, the cluster identifier (or identifiers) may be stored with the pair. Process 700 then ends.

Figure 8:
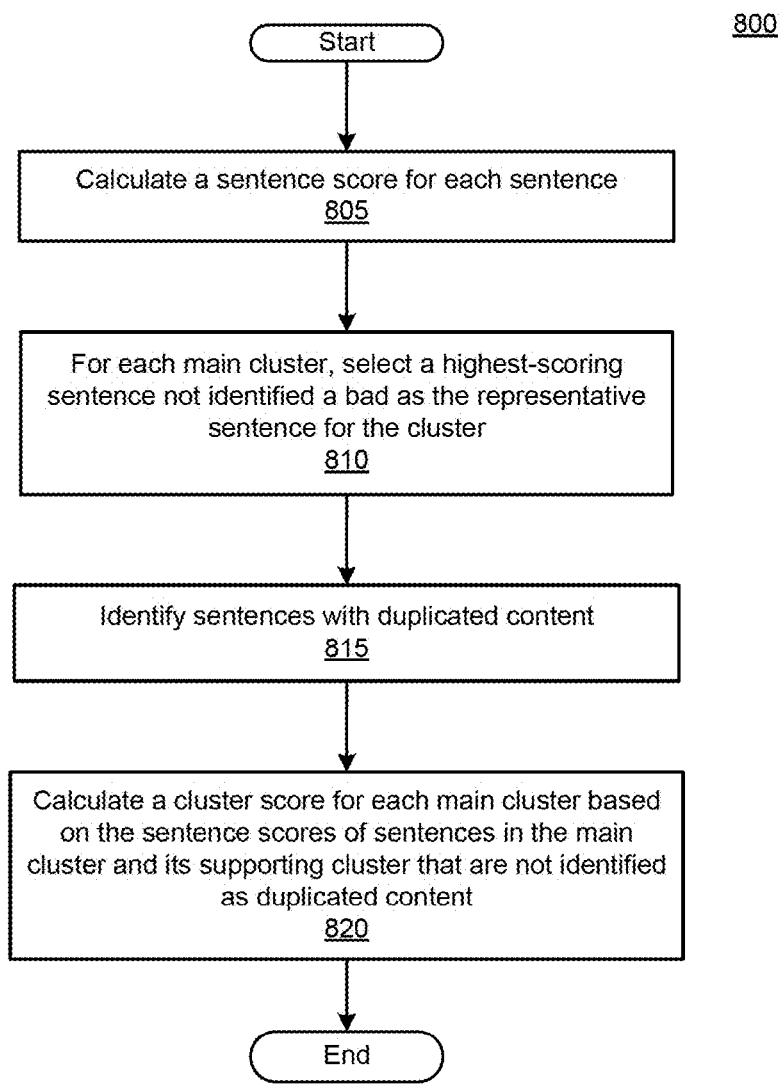
FIG. 8 illustrates a flow diagram of a process for scoring sentences and selecting best expressions of unique facts for an entity, in accordance with some implementations.

FIG. 8 illustrates a flow diagram of a process 800 for scoring sentences and selecting best expressions of unique facts for an entity, in accordance with some implementations. Process 800 may be performed by a system, such as search system 100 of FIG. 1, as part of step 515 of FIG. 5. Process 800 assigns a score to each sentence in the entity-sentence pairs with the goal of identifying the most interesting or unique or fun facts for an entity. In some implementations, the system may also score a cluster and select a best expression of the fact represented by the cluster. Process 800 is discussed for a single entity but a system may perform process 800 for each entity represented by the entity-sentence pairs.

Process 800 may begin by calculating a sentence score for each sentence in the entity-sentence pairs for the entity (805). The sentence score may be a combination of factors. One of the factors may be the topicality score for the pair, e.g., as part of process 600 of FIG. 6. In some implementations the topicality score may be multiplied by the query-independent rank for the source document, e.g., the PageRank of the document from which the sentence was extracted. This boosts the topicality score of an entity-sentence pair when the source document is considered a high-quality document. As discussed in FIG. 6, the topicality score may be a document topicality score, a semantic importance score, or a combination of these or other similar scores. Another factor may be a length factor. The length factor may be a demotion factor that demotes sentences that are too short or too long. In some implementations, too short or too long may be measured against a center point, such as 140 characters, 20 words, etc. The center point may be set or adjusted as a configuration parameter for the system. The system may give a higher demotion the further a length of a sentence strays from the center point. The center point and exact amount of the demotion factor may be implementation specific to meet the needs of the system. In implementations where the factors are combined by addition, the demotion factor may be a negative number, with zero representing no demotion. In implementations where the factors are combined by multiplication, the demotion factor may be a range between zero and a positive number, where the positive number greater than 1 represents no demotion. Similar demotion factors may be used in other implementations.

Another factor may be a promotion factor that measures the fun-quotient of the source document. The fun-quotient measures the fraction of links to the source document and queries for which the source document was included in the search results that include trigger phrases, e.g., the whitelist trigger phrases. For example, if the source document for a particular sentence has ten inbound links and appears in the search results for five queries, and six of the inbound links are associated with a trigger phrase and three of the queries are associated with a trigger phrase, the document may have a fun-quotient factor of 9/15 or 0.60.

Another factor may be an inverse document frequency factor for the sentence. The inverse document frequency factor may be a demotion factor that lowers the sentence score of sentences that lack a rare or unique term. The system may determine the inverse-document-frequency (IDF) score for each term in the sentence and may select the highest IDF score of any term in the sentence as the IDF score for the sentence. The IDF score represents how rare a term is across a corpus of documents, thus terms that occur less frequently across the corpus have a higher IDF score than very common terms. In addition, in some implementations, one or more of the entity-sentence pairs may be rated by an external rater (a human) for an interestingness factor. This factor is subjective to the rater and represents a promotion factor that boosts the score of a sentence when it is present. This factor, when provided, may be included in the score for the sentence and represents a promotion factor.

The system may combine two or more of the factors to compute a sentence score. This is done for each sentence in the entity-sentence pairs. In some implementations the scoring may be performed at the time the entity-sentence pairs are generated, e.g., as part of process 600 of FIG. 6. As one example, the sentence score may be the product of each of the factors used to compute the score. As another example, the sentence score may be a sum of the factors. In some implementations, one or more of the factors may have a weight applied, so that that factor counts more than another in calculating the sentence score. The exact combination of factors must be consistent across sentences, but implementations include various combinations of the factors as outlined above. In some implementations, the sentence score may be stored with the entity-sentence pair.

In an implementation where the sentences are clustered, the system may select a sentence in the cluster that received the highest sentence score (810). This sentence may be selected from the main clusters, not from supporting clusters. The selected sentence may be referred to as a representative sentence and represents the best expression of the fact from the cluster.

The system may also identify sentences for the entity that have duplicated content (815). Although the system may have filtered out documents that are duplicated content as an initial step, the source documents may still have duplicated portions, for example a paragraph that is the same as the paragraph in another document. The system may seek to filter out such duplicate content so that it does not contribute to the cluster score. In some implementations, the system may identify duplicate sentences by looking at the context of the sentence in the source document, for example, the system may look at the sentence that precedes and the sentence that follows the sentence in question. These the preceding sentence and the following sentence match the preceding sentence and the following sentence of another sentence in the same cluster, the system may filter out the sentence with the lower sentence score. This sentence may be flagged, e.g., as an attribute of the entity-sentence pair, as duplicate and may be excluded from scoring the cluster.

The system may calculate a cluster score for each main cluster based on the cluster scores of the sentences in the main cluster and its supporting cluster (820). The calculation may exclude any sentences identified as duplicate content in the previous step. In some implementations, the system may add the sentence scores. In some implementations, the system may store the cluster score so that it can be used in determining which fact to display in response to a query and/or in ordering multiple facts. Process 800 then ends for this entity.

Figure 9:
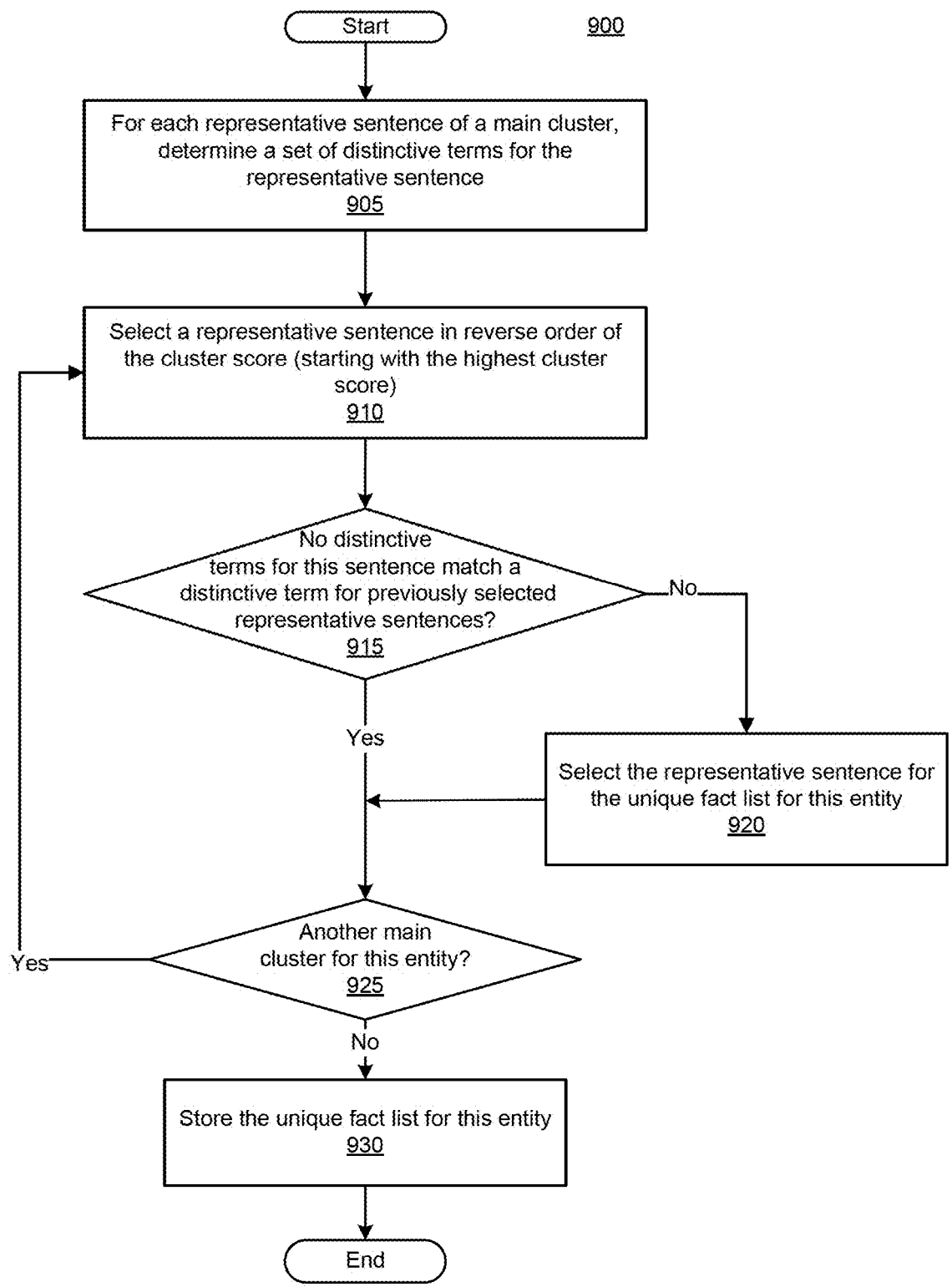
FIG. 9 illustrates a flow diagram of a process for selecting a list of representative sentences for an entity, in accordance with some implementations.

FIG. 9 illustrates a flow diagram of a process 900 for selecting a list of representative sentences for an entity, in accordance with some implementations. Process 900 may be performed by a system, such as search system 100 of FIG. 1. In some implementations process 900 may be performed as part of step 520 of FIG. 5. In some implementations, process 900 may be performed in advance of receiving a query, e.g., as part of process 800. Process 900 determines a list of unique facts for display in response to a query for the entity and aims to exclude facts with duplicate content. Process 900 is discussed for a single entity for ease of discussion, but the system may perform process 900 for each entity represented by the entity-sentence pairs.

Process 900 may begin by determining a set of distinctive terms for each of the representative sentences (905). The representative sentences may have already been selected, e.g., as part of process 800, or may be selected as described above with regard to step 810. A distinctive term is a term that has an inverse document frequency above a specified threshold. This threshold ensures that the terms used to identify unique facts are the less common terms.

The system may begin selecting the representative sentences in reverse order of cluster scores, so that the representative sentence from the cluster with the highest cluster score is selected first (910). The system may then determine whether the representative sentence has any distinctive terms that match a distinctive term from a previously selected representative sentence (915). For example, the system may compare the distinctive terms (identified in step 905) for the sentence with the distinctive terms for any sentences already in the list of unique facts for this entity. If no distinctive terms match a distinctive term for sentences already in the list (915, No), the system may add this representative sentence to the list (920). If there is a distinctive term for this sentence that matches a distinctive term for a sentence already in the list (915, Yes) or after adding the sentence to the list, the system may move to the cluster with the next highest cluster score (925, Yes) and repeat steps 910 to 925 for the representative sentence in that cluster. This loop continues until all clusters for this entity have been processed (925, No). The system may then store the unique fact list for the entity (930). The list may be provided in response to a query for the entity as illustrated by list 201 of FIG. 2.

Figure 10:
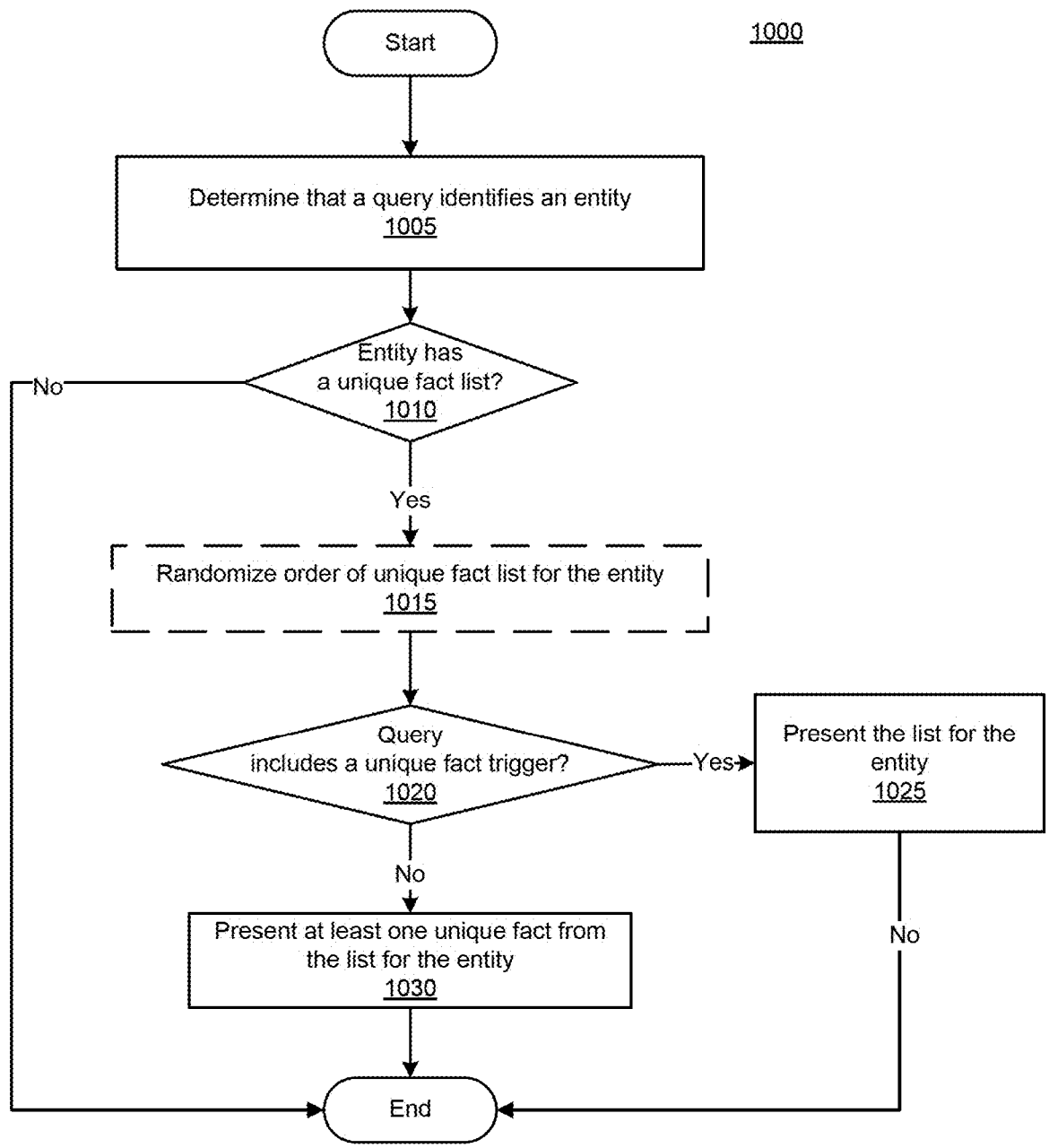
FIG. 10 illustrates a flow diagram of a process for selecting a unique fact for presentation in response to a query for an entity, in accordance with some implementations.

FIG. 10 illustrates a flow diagram of a process 1000 for selecting a unique fact for presentation in response to a query for an entity, in accordance with some implementations. Process 1000 may be performed by a system, such as search system 100 of FIG. 1. In some implementations process 1000 may be performed as part of step 520 of FIG. 5. Process 1000 determines whether to provide unique facts in response to a query, and in what format to provide the facts. Process 1000 is one example process to responding to a query and implementations may include other methods of selecting from the unique facts (e.g., from the entity-sentence pairs or the list of unique facts) for display in response to a query for the entity.

Process 1000 may begin when the systems determines that a query is directed to or identifies an entity (1005). The entity may exist in a knowledge base. The system may then determine whether the entity has any unique facts (1010). In some implementations, the unique facts may be facts in a unique fact list. Such facts are curated by the system to eliminate duplicates and present the best representation of each fact. In some implementations, the system may use entity-sentence pairs. If the entity does not have entity-sentence pairs (1010, No), process 1000 ends and the system may provide a search result from other sources.

If the entity does have unique facts (1010, Yes), in some implementations the system may randomize the order of the unique facts (1015). This may be optional, as in some implementations the system may present the facts in ranked order (e.g., as stored in the list or by sentence score). The system may also determine whether the query includes a unique fact trigger (1020). A unique fact trigger can be one of the phrases used to select documents as unique fact sources. A unique fact trigger can also be selected from a separate set of trigger phrases. Thus, the phrases used to select unique fact sources can be different from the phrases used to identify queries requesting unique or fun facts. In some implementations these may be phrases in a whitelist of trigger phrases. If the query does include such a trigger (1020, Yes), the system may initiate presentation of multiple unique facts for the entity in response to the query (1025). For example, the system may present the entire unique fact list generated as part of process 900. In some implementations, the system may initiate present a subset of the unique fact list. In some implementations, the system may initiate presentation of some quantity of entity-sentence pairs with the highest sentence scores, although not selecting facts via some type of curation (clustering and ranking) risks displaying duplicate facts. If the query does not include the unique fact trigger (1020, No), the system may select one unique fact to include in the search result (1030). This fact may be selected at random or may be selected in order, e.g., in the order they appear in the unique fact list, or in order of sentence score, etc. Thus, each time a user submits a query for the entity without the triggers the system may display a different unique fact. Process 1000 then ends.

Figure 11:
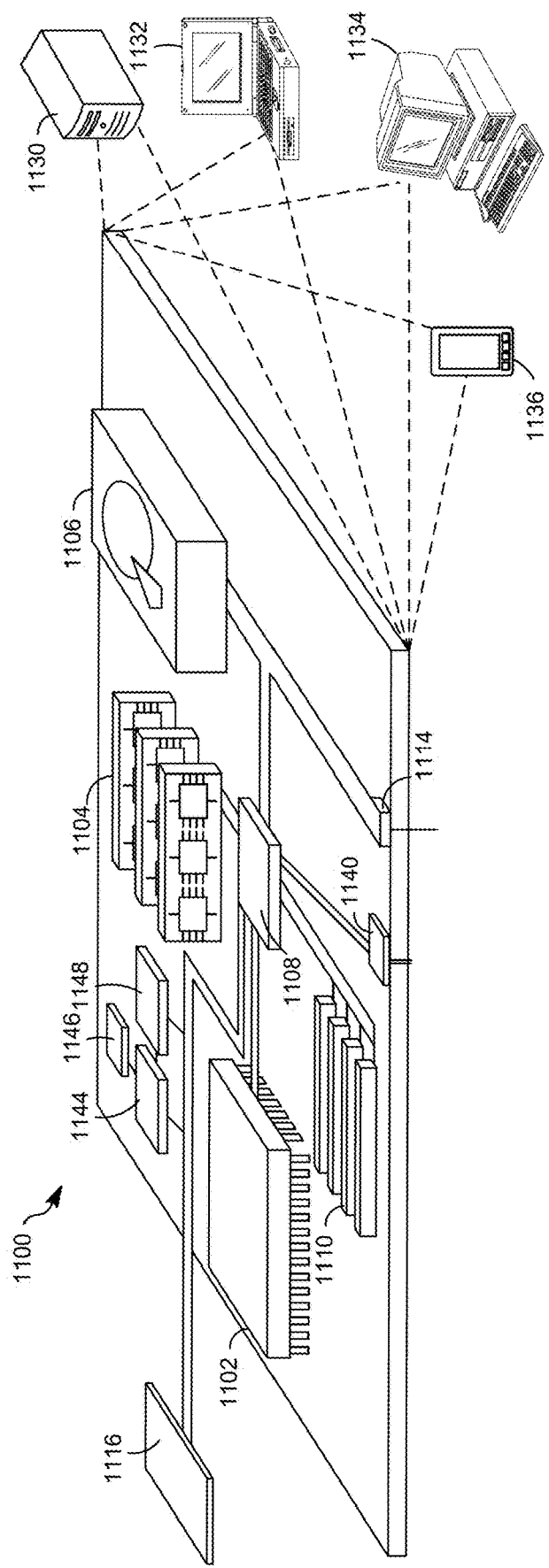
FIG. 11 shows an example of a computer device that can be used to implement the described techniques.

FIG. 11 shows an example of a generic computer device 1100, which may be system 100, and/or client 170 of FIG. 1, which may be used with the techniques described here. Computing device 1100 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 1100 includes a processor 1102, memory 1104, a storage device 1106, and expansion ports 1110 connected via an interface 1108. In some implementations, computing device 1100 may include transceiver 1146, communication interface 1144, and a GPS (Global Positioning System) receiver module 1148, among other components, connected via interface 1108. Device 1100 may communicate wirelessly through communication interface 1144, which may include digital signal processing circuitry where necessary. Each of the components 1102, 1104, 1106, 1108, 1110, 1140, 1144, 1146, and 1148 may be mounted on a common motherboard or in other manners as appropriate.

The processor 1102 can process instructions for execution within the computing device 1100, including instructions stored in the memory 1104 or on the storage device 1106 to display graphical information for a GUI on an external input/output device, such as display 1116. Display 1116 may be a monitor or a flat touchscreen display. In some implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk. In some implementations, the memory 1104 may include expansion memory provided through an expansion interface.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 1104, the storage device 1106, or memory on processor 1102.

The interface 1108 may be a high speed controller that manages bandwidth-intensive operations for the computing device 1100 or a low speed controller that manages lower bandwidth-intensive operations, or a combination of such controllers. An external interface 1140 may be provided so as to enable near area communication of device 1100 with other devices. In some implementations, controller 1108 may be coupled to storage device 1106 and expansion port 1114. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1130, or multiple times in a group of such servers. It may also be implemented as part of a rack server system. In addition, it may be implemented in a personal computer such as a laptop computer 1122, or smart phone 1136. An entire system may be made up of multiple computing devices 1100 communicating with each other. Other configurations are possible.

FIG. 12 shows an example of a generic computer device 1200, which may be system 100 of FIG. 1, which may be used with the techniques described here. Computing device 1200 is intended to represent various example forms of large-scale data processing devices, such as servers, blade servers, datacenters, mainframes, and other large-scale computing devices. Computing device 1200 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1200 may include any number of computing devices 1280. Computing devices 1280 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1280*a* includes multiple racks 1258*a*-1258*n*. Each rack may include one or more processors, such as processors 1252*a*-1252*n* and 1262*a*-1262*n*. The processors may include data processors, network attached storage devices, and other computer controlled devices. In some implementations, one processor may operate as a master processor and control the scheduling and data distribution tasks. Processors may be interconnected through one or more rack switches 1258, and one or more racks may be connected through switch 1278. Switch 1278 may handle communications between multiple connected computing devices 1200.

Each rack may include memory, such as memory 1254 and memory 1264, and storage, such as 1256 and 1266. Storage 1256 and 1266 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1256 or 1266 may be shared between multiple processors, multiple racks, or multiple computing devices and may include a computer-readable medium storing instructions executable by one or more of the processors. Memory 1254 and 1264 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1254 may also be shared between processors 1252*a*-1252*n*. Data structures, such as an index, may be stored, for example, across storage 1256 and memory 1254. Computing device 1200 may include other components not shown, such as controllers, buses, input/output devices, communications modules, etc.

An entire system, such as system 100, may be made up of multiple computing devices 1200 communicating with each other. For example, device 1280*a* may communicate with devices 1280*b*, 1280*c*, and 1280*d*, and these may collectively be known as system 100. As another example, system 100 of FIG. 1 may include one or more computing devices 1200 as unique fact discovery system 110 or query system 120. Furthermore, some of the computing devices may be located geographically close to each other, and others may be located geographically distant. The layout of system 1200 is an example only and the system may take on other layouts or configurations.

According to certain aspects, a system includes a data store storing unique fact triggers and a query handling system. The query handling system can include at least one processor and a memory storing instructions that, when executed by the at least one processor, cause the query handling system to perform operations. The operations include selecting, from a document repository, documents associated with at least one unique fact trigger and generating entity-sentence pairs for a first entity. The entity may be an entity in a knowledge base storing entities and respective facts. Generating the entity-sentence pairs includes extracting sentences from the selected documents and, for each of at least some of the sentences, identifying a reference to a first entity in the sentence and storing the sentence and an identifier for the document from which the sentence was extracted as an entity-sentence pair for the first entity. The operations also include generating at least one main unique fact cluster for the first entity by clustering the entity-sentence pairs on salient terms and determining a representative sentence for each of the at least one main unique fact cluster. The operations also include providing at least one of the representative sentences in response to a query that identifies the first entity.

These and other aspects may include one or more of the following features. For example, selecting documents associated with at least one unique fact trigger can include, for a first document of the selected documents, identifying a unique fact trigger phrase in text associated with a link to the first document and/or identifying a unique fact trigger phrase in a first query stored in a data store of historical search records, the first document being identified in a search result for the first query in the data store of historical search records and/or eliminating from selection documents associated with at least one blacklist phrase, the blacklist phrase including at least one of lies, myths, and fake. As another example, the sentences selected from the documents may be selected from a central portion that excludes comments.

As another example, generating the at least one main unique fact cluster can include determining a set of salient terms for each sentence and clustering a first sentence and a second sentence when the respective sets of salient terms are equivalent. The set of salient terms excludes stop words. A first term and a second term are equivalent when the first term and the second term are the same, the first term is a synonym of the second term, or the first term and the second term are numbers, regardless of a value represented by the numbers. As another example, providing at least one of the representative sentences in response to a query can include providing all of the representative sentences as a scrollable list. As another example, for each entity-sentence pair stored the first entity has met a topicality threshold. The topicality threshold is a function of a type of the first entity and the topicality of the first entity to the document from which the sentence was extracted.

According to certain aspects, a method includes selecting documents associated with at least one unique fact trigger. The documents are from a document repository. The method also includes generating entity-sentence pairs from the documents selected. An entity in an entity-sentence pair is from a knowledge base and is associated with a sentence in an entity-sentence pair when the sentence includes a mention of the entity. The method also includes, for a first entity of the entities represented by the entity-sentence pairs, clustering the entity-sentence pairs for the first entity using salient terms occurring in the sentence, the clustering resulting in main clusters, wherein at least one main cluster has a supporting cluster, and determining a representative sentence for each of the main clusters. The method also includes providing at least one of the representative sentences in response to a query that identifies the first entity.

These and other aspects may include one or more of the following features. For example, the method may also include, for each sentence of the entity-sentence pairs for the first entity, determining whether the sentence is classified as bad or good with respect to the first entity. Only sentences classified as good are eligible to be a representative sentence. Determining whether the sentence is classified as bad or good can include determining whether the sentence includes a pronoun and, responsive to determining that the sentence does include a pronoun, determining whether the pronoun refers to a topic of the sentence or to a noun in the sentence and classifying the sentence as good when the pronoun refers to a topic of the sentence or to a noun in the sentence. Determining whether the sentence is classified as bad or good can also include determining whether the sentence includes a noun referred to by a proper noun elsewhere in a source of the sentence and, responsive to determining that the sentence does include a noun referred to by a proper noun, determining that the noun refers to a topic of the sentence or that the sentence includes the proper noun and classifying the sentence as good responsive to the determining.

As another example, determining the representative sentence for each main cluster can include calculating a sentence score for each sentence in the entity-sentence pairs in the main cluster and selecting a sentence with a highest sentence score as the representative sentence for the main cluster. The sentence score can include an importance factor based on a semantic importance of the first entity to the sentence. The sentence score can include a document topicality score for the first entity to the document. The sentence score can be based on a document topicality score for the first entity, a semantic importance of the first entity to the sentence, a rank for a source of the sentence, and a length of the sentence.

According to certain aspects, a method includes determining that a query relates to an entity in a knowledge base and includes a unique fact trigger, determining that the entity has an associated unique fact list, the unique fact list including sentences extracted from source documents that mention the entity, and providing the unique fact list in response to the query.

These and other aspects can include one or more of the following features. For example, the method may also include generating a list of documents from a document repository that are responsive to the query and providing the documents that are responsive to the query with the unique fact list. As another example, the unique fact list is presented in a position of prominence with regard to the list of documents responsive to the query. As another example the unique fact list is provided as a scrollable list.

According to certain aspects, a method includes determining that a query relates to an entity in a knowledge base and determining that the entity has an associated unique fact list. The unique fact list includes sentences extracted from source documents that mention the entity. The method also includes selecting at least one of the unique facts from the unique fact list and providing the at least one unique fact in response to the query.

These and other aspects can include one or more of the following features. For example, the method may also include ordering the unique facts in the unique fact list in a random order and selecting, as the at least one unique fact, a first unique fact in the unique fact list. As another example the method may also include ordering the unique facts in the unique fact list in a random order, determining that the query includes a unique fact trigger, and providing, responsive to the determining, the unique facts in the random order in response to the query. As another example, the method may also include obtaining, from the knowledge base, facts about the entity and providing the facts from the knowledge base with the at least one unique fact, wherein the knowledge base lacks the unique fact about the entity.

According to certain aspects, a computer system includes a processor and memory having stored thereon instructions that, when executed by a processor, cause the system to perform any of the methods or operations disclosed herein:

According to certain aspects, a non-transitory computer-readable medium has code segments stored thereon, the code segments, when executed by a processor cause the processor to perform any of the methods or operations disclosed herein:

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
a data store storing unique fact triggers; and
a query handling system that includes:
at least one processor, and
a memory storing instructions that, when executed by the at least one processor, cause the query handling system to perform operations including:
selecting, from a document repository, documents associated with at least one unique fact trigger, the at least one unique fact trigger including a whitelisted trigger phrase that identifies the documents as including unique facts,
generating entity-sentence pairs for a first entity by:
extracting sentences from the selected documents and,
for each sentence of at least some of the sentences:
identifying a reference to the first entity in the sentence, and
storing the sentence and an identifier for the document from which the sentence was extracted as an entity-sentence pair for the first entity,
generating at least one main unique fact cluster for the first entity by clustering the entity-sentence pairs on salient terms,
determining a representative sentence for the at least one main unique fact cluster,
determining a topicality score for the representative sentence with respect to the documents associated with the at least one unique fact trigger,
determining a topicality threshold based on a breadth of a category of entity referred to by the entity-sentence pair associated with the representative sentence, and
based on the topicality score meeting the topicality threshold, providing the representative sentence in response to a query that identifies the entity referred to by the entity-sentence pair associated with the representative sentence.

2. The system of claim 1, wherein selecting the documents associated with the at least one unique fact trigger includes, for a first document of the selected documents:
identifying a unique fact trigger phrase in text associated with a link to the first document.

3. The system of claim 1, wherein selecting the documents associated with the at least one unique fact trigger includes, for a first document of the selected documents:
identifying a unique fact trigger phrase in a first query stored in a data store of historical search records; and
determining that the first document is identified in a search result for the first query in the data store of historical search records.

4. The system of claim 1, wherein selecting the documents associated with the at least one unique fact trigger includes, for a first document of the selected documents:
eliminating, from selection, documents associated with at least one blacklist phrase, the blacklist phrase including at least one of lies, myths, or fake.

5. The system of claim 1, wherein the sentences selected from the documents are selected from a central portion that excludes comments.

6. The system of claim 1, wherein generating the at least one main unique fact cluster includes:
determining a set of salient terms for each sentence, wherein the set of salient terms excludes stop words; and
clustering a first sentence and a second sentence when the respective sets of salient terms are equivalent, where a first term and a second term are equivalent when:
the first term matches the second term,
the first term is a synonym of the second term, or
the first term and the second term are numbers, regardless of a value represented by the numbers.

7. The system of claim 1, wherein providing the representative sentences in response to a query includes:
providing representative sentences from unique fact clusters for the first entity as a scrollable list.

8. The system of claim 1, wherein for each entity-sentence pair stored, the first entity meets a topicality threshold, wherein the topicality threshold is a function of a type of the first entity and a topicality of the first entity to the document from which the sentence was extracted.

9. A method comprising:
selecting, from a document repository, documents associated with at least one unique fact trigger;
generating entity-sentence pairs from the documents selected, where an entity from a knowledge base is associated with a sentence in an entity-sentence pair when the sentence includes a mention of the entity;
for a first entity of entities represented by the entity-sentence pairs:
clustering the entity-sentence pairs for the first entity using salient terms occurring in the sentence, the clustering resulting in main clusters, wherein at least one main cluster has a supporting cluster, wherein the salient terms include terms in the sentence that are not stop words, and
determining a representative sentence for each of the main clusters;
determining topicality scores for the representative sentences with respect to the documents from which the entity-sentence pairs within the main clusters, for which the representative sentences were determined, were generated;
determining a topicality threshold based on a breadth of a category of entity referred to by the entity-sentence pair; and
based on the topicality score meeting the topicality threshold, providing at least one of the representative sentences in response to a query that identifies the first entity.

10. The method of claim 9, further comprising, for each sentence of the entity-sentence pairs for the first entity:
determining whether the sentence is classified as bad or good with respect to the first entity,
wherein only sentences classified as good are eligible to be a representative sentence.

11. The method of claim 10, wherein determining whether the sentence is classified as bad or good includes:

determining whether the sentence includes a pronoun; and
responsive to determining that the sentence does include a pronoun:
  determining whether the pronoun refers to a topic of the sentence or to a noun in the sentence; and
  classifying the sentence as good when the pronoun refers to a topic of the sentence or to a noun in the sentence.

12. The method of claim 10, wherein determining whether the sentence is classified as bad or good includes:
determining whether the sentence includes a noun referred to by a proper noun elsewhere in a source of the sentence; and
responsive to determining that the sentence does include a noun referred to by a proper noun:
  determining that the noun refers to a topic of the sentence or that the sentence includes the proper noun, and
  classifying the sentence as good responsive to the determining.

13. The method of claim 9, wherein determining the representative sentence includes, for each main cluster:
calculating a sentence score for each sentence in the entity-sentence pairs in the main cluster, the sentence score including an importance factor based on a semantic importance of the first entity to the sentence; and
selecting a sentence with a highest sentence score as the representative sentence for the main cluster.

14. The method of claim 9, wherein determining the representative sentence includes, for each main cluster:
calculating a sentence score for each sentence in the entity-sentence pairs in the main cluster, the sentence score including a document topicality score for the first entity to the document; and
selecting a sentence with a highest sentence score as the representative sentence for the main cluster.

15. The method of claim 9, wherein determining the representative sentence includes, for each main cluster:
calculating a sentence score for each sentence in the entity-sentence pairs in the main cluster, the sentence score being based on a document topicality score for the first entity, a semantic importance of the first entity to the sentence, a rank for a source of the sentence, and a length of the sentence; and
selecting a sentence with a highest sentence score as the representative sentence for the main cluster.

16. A non-transitory medium having code segments stored thereon, the code segments, when executed by a processor cause the processor to:
determine that a query relates to an entity in a knowledge base and includes a unique fact trigger, the unique fact trigger including a whitelisted trigger phrase;
determine that the entity has a unique fact list, the unique fact list including sentences extracted from source documents that mention the entity, wherein sentences in the unique fact list are included in response to determining a topicality score for the sentences with respect to the source documents and meeting a topicality threshold that is based on a breadth of a category of the entity; and
provide the unique fact list in response to the query.

17. The non-transitory medium of claim 16, the code segments further causing the processor to:
generate a list of documents from a document repository that are responsive to the query; and
provide the list of documents that are responsive to the query with the unique fact list.

18. The non-transitory medium of claim 17, wherein the unique fact list is presented in a position of prominence with regard to the list of documents responsive to the query.

19. The non-transitory medium of claim 16, wherein the unique fact list is provided as a scrollable list.

20. A method comprising:
determining that a query relates to an entity in a knowledge base and includes a unique fact trigger, the unique fact trigger including a whitelisted trigger phrase;
determining that the entity has a unique fact list, the unique fact list including sentences extracted from source documents that mention the entity, wherein sentences in the unique fact list are included in response to determining respective topicality scores for the sentences with respect to the source documents and meeting a topicality threshold that is based on a breadth of a category of the entity;
randomly selecting at least one unique fact from the unique fact list; and
providing the at least one unique fact in response to the query.

21. The method of claim 20, wherein randomly selecting the at least one unique fact further comprises:
ordering the unique fact list in a random order; and
selecting, as the at least one unique fact, a first unique fact in the unique fact list.

22. The method of claim 20, further comprising:
ordering the unique fact list in a random order; and
providing unique facts from the unique fact list in the random order in response to the query.

23. The method of claim 20, further comprising:
obtaining, from the knowledge base, facts about the entity; and
providing the facts from the knowledge base with the at least one unique fact, wherein the knowledge base lacks the at least one unique fact about the entity.

* * * * *

UNITED STATES PATENT AND TRADEMARK OFFICE
CERTIFICATE OF CORRECTION

| | | |
|---|---|---|
| PATENT NO. | : 11,568,274 B2 | Page 1 of 1 |
| APPLICATION NO. | : 15/648047 | |
| DATED | : January 31, 2023 | |
| INVENTOR(S) | : Nanavati et al. | |

It is certified that error appears in the above-identified patent and that said Letters Patent is hereby corrected as shown below:

In the Claims

In Column 26, Claim 7, Line 23, delete "sentences" and insert -- sentence --, therefor.

Signed and Sealed this
Third Day of October, 2023

*Katherine Kelly Vidal*

Katherine Kelly Vidal
*Director of the United States Patent and Trademark Office*